(12) United States Patent
Cherkasova et al.

(10) Patent No.: US 7,424,528 B2
(45) Date of Patent: Sep. 9, 2008

(54) SYSTEM AND METHOD FOR MEASURING THE CAPACITY OF A STREAMING MEDIA SERVER

(75) Inventors: Ludmila Cherkasova, Sunnyvale, CA (US); Loren Staley, Granite Bay, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1034 days.

(21) Appl. No.: 10/306,279

(22) Filed: Nov. 27, 2002

(65) Prior Publication Data

US 2004/0103189 A1 May 27, 2004

(51) Int. Cl.
*G06F 15/173* (2006.01)
(52) U.S. Cl. .................. 709/224; 709/231; 709/232
(58) Field of Classification Search .............. 709/224, 709/231, 232
See application file for complete search history.

(56) References Cited

U.S. PATENT DOCUMENTS

| | | | |
|---|---|---|---|
| 5,732,239 | A | 3/1998 | Tobagi et al. |
| 5,734,119 | A | 3/1998 | France et al. |
| 5,815,662 | A | 9/1998 | Ong |
| 5,845,279 | A * | 12/1998 | Garofalakis et al. ............ 707/7 |
| 6,101,547 | A | 8/2000 | Mukherjee et al. |
| 6,178,480 | B1 | 1/2001 | Tobagi et al. |
| 6,330,609 | B1 * | 12/2001 | Garofalakis et al. ......... 709/229 |
| 6,401,126 | B1 * | 6/2002 | Douceur et al. ............ 709/231 |
| 6,434,621 | B1 | 8/2002 | Pezzillo et al. |
| 6,466,980 | B1 | 10/2002 | Lumelsky et al. |
| 2002/0083124 | A1 | 6/2002 | Knox et al. |
| 2002/0091722 | A1 | 7/2002 | Gupta et al. |
| 2002/0129048 | A1 | 9/2002 | Qiu et al. |
| 2002/0150102 | A1 | 10/2002 | Janko et al. |
| 2002/0156552 | A1 | 10/2002 | Whiting |
| 2003/0061362 | A1 * | 3/2003 | Qiu et al. .................... 709/229 |
| 2004/0103189 | A1 * | 5/2004 | Cherkasova et al. ......... 709/224 |

OTHER PUBLICATIONS

Chase, J. et al., "Managing Energy and Server Resources in Hosting Centers," Dept. of Computer Science, Duke University, 14 pages, no date.

Eager, D. et al., "Optimal and Efficient Merging Schedules for Video-on-Demand Servers," Proc. ACM Multimedia 1999, 4 pages.

Nahrstedt, K. et al., "A Probe-based Algorithm for QoS Specification and Adaptation," Univ. of Illinois at Urbana Champaign, pp. 1-12, no date.

Nahrstedt, K. et al., "QoS-Aware Resource Managment for Distributed Multimedia Applications," Univ. of Illinois at Urbana Champaign, Dept. of Computer Science, pp. 1-37, no date.

(Continued)

*Primary Examiner*—John Follansbee
*Assistant Examiner*—Nghi V Tran

(57) ABSTRACT

In one embodiment of the present invention, a method for measuring the capacity of a media server for supporting concurrent media streams to a population of clients is provided. The method comprises identifying a mixed workload, wherein the mixed workload corresponds to a number of media streams served concurrently by the media server to a population of clients wherein all of said number of media streams do not comprise common content encoded at a common bit rate. The method further comprises using a cost function to compute a load for the media server under the mixed workload.

16 Claims, 12 Drawing Sheets

OTHER PUBLICATIONS

Ranjan, S. et al., "QoS-Driven Server Migration for Internet Data Centers," Proc. of IWQoS 2002, 10 pages, no date.

Shenoy, P. et al., "Middlew are versus Native OS Support: Architectural Considerations for Supporting Multimedia Applications," Univ. of Massachusetts, Dept. of Computer Science, 10 pages, no date.

Cherkosova, L. et al., "Building a Performance Model of Streaming Media Applications in Utility Data Center Environment," Hewlett-Packard Laboratories, Internet Systems and Storage Lab, 12 pages, no date.

Acharya, S. et al., "Characterizing User Access To Videos On The World Wide Web," Part of the IS&T/SPIE Conference on Multimedia computing and Networking 2000, SPIE vol. 3969, 2000, pp. 130-141.

Almeida, J. et al., "Analysis of Educational Media Server Workloads," Proc. 11th Int'l. Workshop, 2001, 10 pages.

Dan, A. et al., "Buffering and Caching in Large-Scale Video Servers," IEEE 1995, pp. 217-224.

Kim, I. et al., "VBR Video Data Scheduling using Window-Based Prefetching," IEEE 1999, pp. 159-164.

Cherkasova, L. et al., "Characterizing Locality, Evolution, and Life span of Accesses in Enterprise Media Server Workloads," NOSSDAV '02, May 12-14, 2002, 10 pages.

* cited by examiner

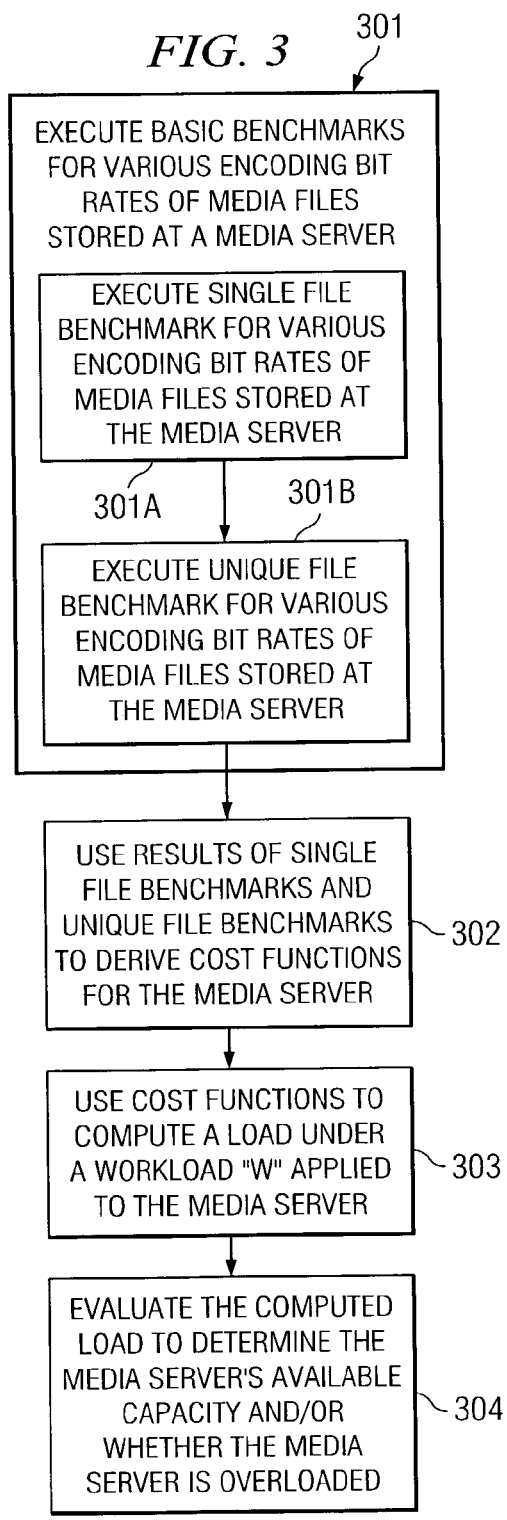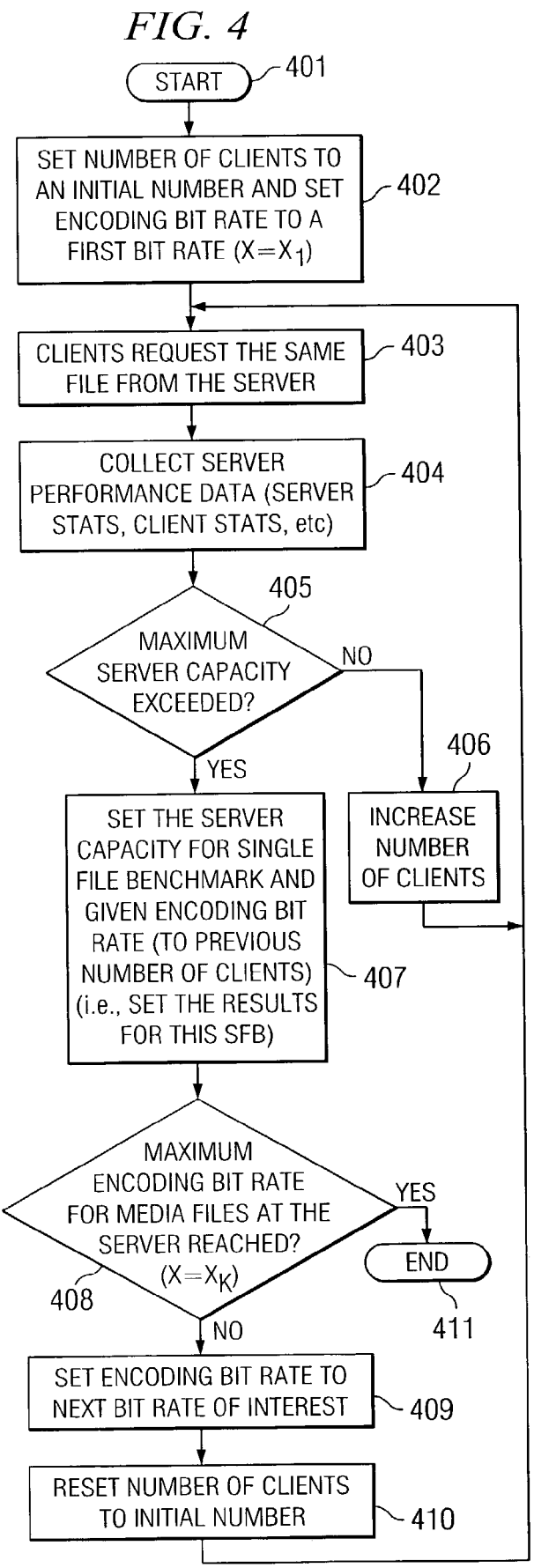

SERVER CAPACITY (CONCURRENT STREAMS)

BANDWIDTH (Mb/s)

NORMALIZED SERVER CAPACITY IN STREAMS

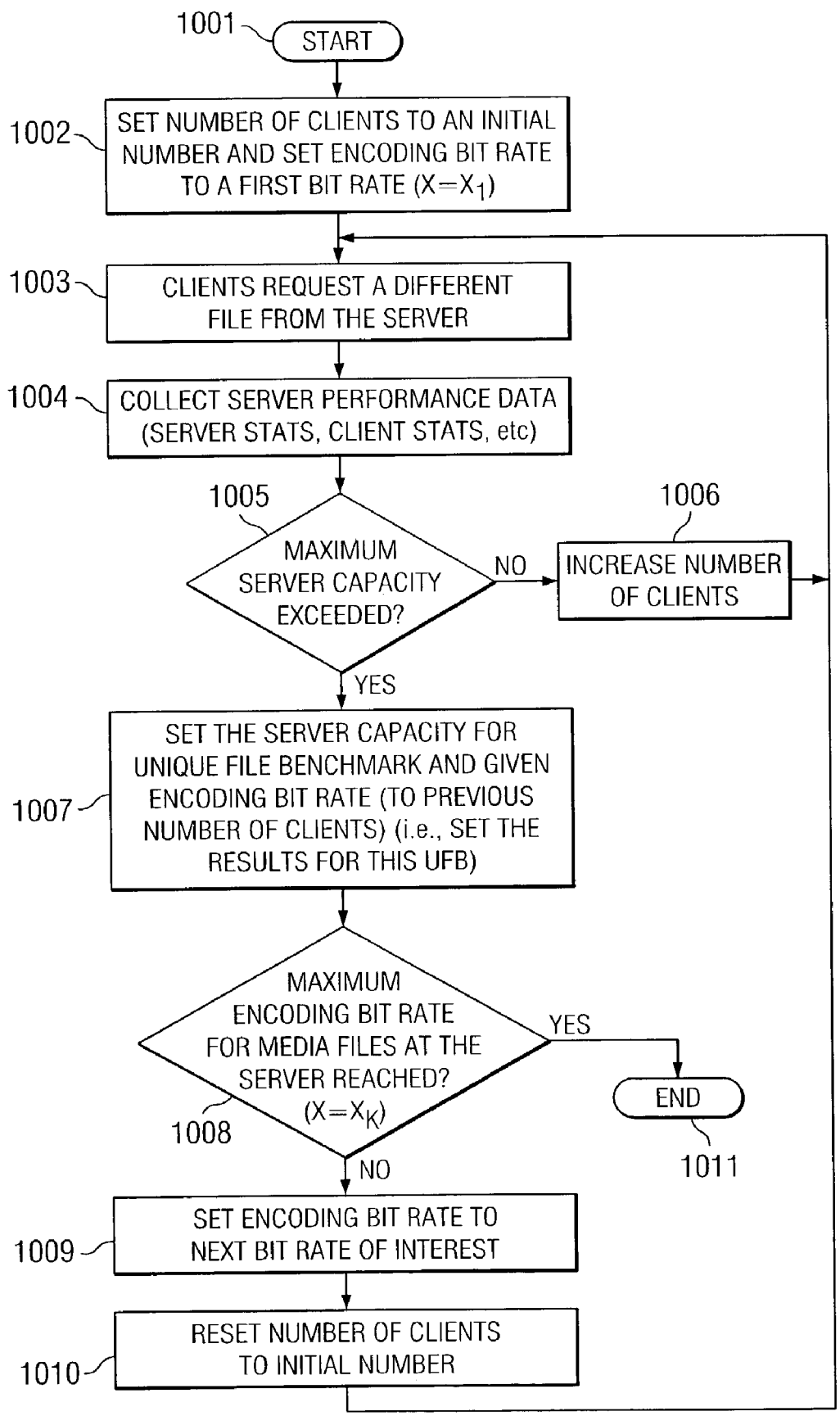

SYSTEM AND METHOD FOR MEASURING THE CAPACITY OF A STREAMING MEDIA SERVER

FIELD OF THE INVENTION

The present invention relates in general to streaming media technologies, and more specifically to systems and methods for measuring the capacity of a streaming media server for supporting concurrent streams to a population of clients.

DESCRIPTION OF RELATED ART

Today, much information is stored as digital data that is available to processor-based devices via client-server networks. Client-server networks are delivering a large array of information (including content and services) such as news, entertainment, personal shopping, airline reservations, rental car reservations, hotel reservations, on-line auctions, on-line banking, stock market trading, as well as many other services and types of content. Such information providers (sometimes referred to as "content providers") are making an increasing amount of information available to users via client-server networks.

An abundance of information is available on client-server networks, such as the Internet, Intranets, the World Wide Web (the "web"), other Wide and Local Area Networks (WANs and LANs), wireless networks, and combinations thereof, as examples, and the amount of information available on such client-server networks is continuously increasing. Further, users are increasingly gaining access to client-server networks, such as the web, and commonly look to such client-server networks (as opposed to or in addition to other sources of information) for desired information. For example, a relatively large segment of the human population has access to the Internet via personal computers (PCs), and Internet access is now possible with many mobile devices, such as personal digital assistants (PDAs), mobile telephones (e.g., cellular telephones), etc.

An increasingly popular type of technology for providing information to clients is known as "streaming media." Streaming media is a well-known technology in the computer arts. In general, streaming media presents data (e.g., typically audio and/or video) to a client in a streaming or continuous fashion. That is, with streaming media a client is not required to receive all of the information to be presented before the presentation begins. Rather, presentation of information in a streaming media file may begin before all of the file is received by the client, and as the received portion of the file is being presented, further portions of the file continue to be received by the client for later presentation. Thus, streaming media involves media (e.g., typically audio and/or video) that is transmitted from a server (a media server) to a client and begins playing on the client before fully downloaded.

Streaming media is a particularly popular technique for communicating audio and/or video files from a server to a client. Audio and video files tend to be quite large, even after being compressed. If streaming media is not used, an entire file is generally required to be downloaded to a client before the client can begin to play the file. Such a download may require an undesirably long delay before the client can begin playing the file. With streaming media (e.g., streaming audio or streaming video), a client is not required to wait until the entire file is downloaded to play it. Instead, the client can begin playing the file (e.g., presenting the video and/or audio to a user) while it downloads to the client.

Streaming media has quickly become the most popular form of multimedia content on the Internet. Video from news, sports, and entertainment sites are more popular than ever. Media servers are also being used for educational and training purposes by many universities. Further, use of media servers in the enterprise environment is also gaining momentum. Many radio broadcasts are available over the Internet, which make use of streaming audio to enable a much wider audience access to their broadcasts.

In view of the above, the area of multimedia services in a networked environment is a rapidly expanding field in today's technological world. The delivery of continuous media from a central server complex to a large number of (geographically distributed) clients is a challenging and resource intensive task. Media servers are commonly implemented for providing streaming media to clients. Various streaming media files may be provided concurrently by a media server to various different clients. That is, a plurality of clients may concurrently access streaming media files from the media server. Of course, limits exist as to how many concurrent streams a media server can support for a given client population. That is, limits exist as to the capacity of a media server for supporting a given "workload" (i.e., a number of concurrent client accesses of streaming media from the media server).

A satisfactory technique for measuring the capacity of a media server under realistic workloads is not available in the prior art. A standard commercial stress test used by most media server vendors measures a maximum number of concurrent streams deliverable by the server when all of the clients are accessing the same file encoded at a certain fixed bit rate. That is, in standard commercial stress tests, vendors use a particular streaming media file that is encoded for transmission at a particular bit rate for measuring the maximum number of concurrent streams that clients can retrieve of this file.

The standard commercial stress test approach is unsatisfactory for several reasons. First, media files are often encoded for transmission at different bit rates. For instance, clients in a given population have different speed connections to the Internet (or other client-server network). For example, in a realistic population of clients, different clients typically comprise various different speed connections, such as dial-up modem connections (e.g., using a 28 or 56 kilobits analog modem), Integrated Services Digital Network (ISDN) connections, cable modem connections, Digital Subscriber Line (DSL) connections, and even higher-bandwidth connections, as examples. Accordingly, different clients may have different speed connections to the Internet varying, for example, from 28 kilobits (Kb) per second to 500 Kb (or more) per second, thus resulting in requirements for different bit rate encodings at the streaming media files being accessed by the different clients. That is, a media server may comprise streaming media files encoded for transmission at various different bit rates (e.g., 28 Kb/s, 56 Kb/s, etc.), and may attempt to serve the most appropriate encoded file to a client based at least in part on the client's connection speed to the Internet.

Additionally, clients typically may access different media files from the server. That is, a media server commonly provides a plurality of different media files, various ones of which may be accessed concurrently by different clients. When concurrent accesses of a single file is measured, it leads to measurement of the server's capacity for serving a streaming media file from memory, which is often not actually the case. Accordingly, the standard commercial stress tests used by most media server vendors are unsatisfactory for obtaining an accurate measurement of the capacity of a media server for supporting a realistic workload in serving streaming media files to clients.

BRIEF SUMMARY OF THE INVENTION

In accordance with an embodiment of the present invention, a method for measuring the capacity of a media server for supporting concurrent media streams to a population of clients is provided. The method comprises identifying a mixed workload, wherein the mixed workload corresponds to a number of media streams served concurrently by the media server to a population of clients wherein all of said number of media streams do not comprise common content encoded at a common bit rate. The method further comprises using a cost function to compute a load for the media server under the mixed workload.

In accordance with another embodiment of the present invention, a system for measuring the capacity of a media server for supporting concurrent media streams to a population of clients is provided. The system comprises means for receiving a mixed workload applied to a media server, wherein the mixed workload corresponds to a number of media streams being served concurrently by the media server to a population of clients in which all of said number of media streams do not comprise common content encoded at a common bit rate. The system further comprises means for computing a cost to the media server in terms of consumed media server resources for supporting the mixed workload.

In accordance with another embodiment of the present invention, computer-executable software code stored to a computer-readable medium is provided, the computer-executable software code for measuring the capacity of a media server for supporting concurrent media streams to a population of clients. The computer-executable software code comprises code for receiving identification of a mixed workload, wherein the mixed workload corresponds to a number of media streams served concurrently by the media server to a population of clients in which all of said number of media streams do not comprise common content encoded at a common bit rate. The computer-executable software code further comprises code for computing a load for the media server under the mixed workload, wherein the load corresponds to the amount of resources available to the media server that are consumed for supporting the mixed workload.

In accordance with another embodiment of the present invention, a method of deriving a cost function for measuring the capacity of a media server for supporting concurrent media streams to a population of clients is provided. The method comprises determining the results of a single file benchmark for each of a plurality of encoding bit rates of a single file served by a media server, wherein the result of the single file benchmark for a given encoding bit rate identifies the maximum number of concurrent streams of the single file that the media server can supply to a population of clients at the given encoding bit rate. The method further comprises determining the results of a unique file benchmark for each of the plurality of encoding bit rates, wherein the result of the unique file benchmark for a given encoding bit rate identifies the maximum number of concurrent streams of different files that the media server can supply to a population of clients at the given encoding bit rate. The method further comprises using the single file benchmark and unique file benchmark for deriving a cost function for measuring the capacity of the media server for supporting concurrent media streams to a population of clients.

In accordance with another embodiment of the present invention, a method of determining a limiting resource factor for a media server under an applied workload of concurrent media streams being served to a population of clients is provided. The method comprises using a cost function for computing a load for a media server under an applied workload of concurrent media streams served by the media server to a population of clients, wherein the computed load corresponds to the amount of resources available to the media server that are consumed for supporting the applied workload. The method further comprises determining from the computed load whether the media server's capacity for supporting the applied workload is exceeded, and if the media server's capacity for supporting the applied workload is exceeded, identifying which of a plurality of media server resources are exceeded under the applied workload.

BRIEF DESCRIPTION OF THE DRAWINGS

FIG. 3 shows an operational flow diagram illustrating a technique for measuring the capacity of a media server under a realistic workload applied thereto in accordance with an embodiment of the present invention;

FIG. 4 shows an example operational flow diagram for executing Single File Benchmarks (SFBs) for a media server in accordance with an embodiment of the present invention;

FIG. 10 shows an example operational flow diagram for executing Unique File Benchmarks (UFBs) for a media server in accordance with an embodiment of the present invention;

DETAILED DESCRIPTION

Figure 1:
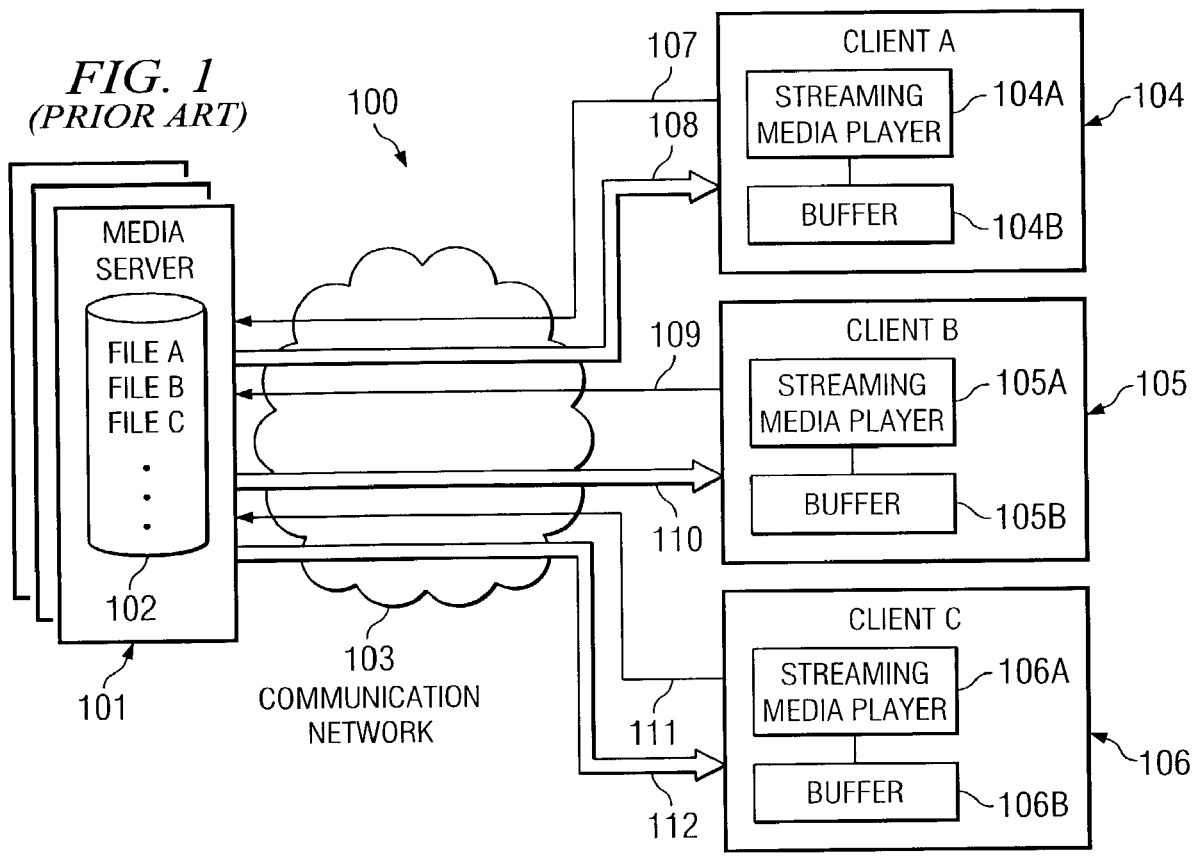
FIG. 1 shows an example client-server system in which embodiments of the present invention may be implemented.

Various embodiments of the present invention are now described with reference to the above figures, wherein like reference numerals represent like parts throughout the several views. As described further below, embodiments of the present invention enable accurate measurement of media server's capacity for serving streaming media under a given workload. A preferred embodiment enables measurement of media server capacity for a realistic workload. Such a realistic workload may comprise various different clients of a population of clients having various different speed connections to the client-server network (e.g., the Internet). Further, such realistic workload may comprise various different clients accessing different ones of a plurality of different streaming media files available on the media server. That is, an applied workload to the media server may comprise a "mixed" workload, and embodiments of the present invention enable measurement of the server's capacity for serving streaming media under such a mixed workload.

As used herein, a "mixed" workload refers to a workload in which all clients accessing the media server are not accessing the same file (or content) encoded for transmission at the same access bit rate. As one example of a mixed workload, all clients in a population of clients that are concurrently accessing a media server may access common content from files encoded for transmission at different bit rates. As another example of a mixed workload, all of the clients may be accessing different content from files that are each encoded for transmission at the same bit rate. As a further example of a mixed workload (which is typically a more realistic case), different segments of the population of clients may be accessing different content from files that are encoded for transmission at different bit rates. Embodiments of the present invention enable measurement of the capacity of a media server for serving concurrent streams to a population of clients under a mixed workload applied by the clients to the media server. Thus, for example, a determination may be made in certain implementations as to whether the server is capable of supporting the applied workload (e.g., whether the server is overloaded) and/or the remaining available capacity, if any, of the server for supporting a further workload.

As described further below, a preferred embodiment of the present invention provides a cost function for measuring the capacity of a media server under an applied workload. More specifically, a cost function is provided that enables computation of the consumed resources of a media server for supporting an applied workload thereto by a population of clients concurrently accessing media file(s) of the server. In this manner, concurrent streams being supported by a media server under an applied workload are viewed as a cost to available resources of the media server, and a cost function for the media server enables computation of the overall cost to the media server for supporting an applied workload, from which a determination may be made as to whether the server is capable of supporting the applied workload (or whether the server is overloaded). The term "cost function" is used broadly herein and is intended to encompass any function for computing the amount of media server resources that are consumed for supporting an applied workload. As described below, in a preferred embodiment, benchmarks are used for determining the cost function for a media server.

Having the ability to measure the capacity of a media server for supporting a given workload is desirable for several reasons. As one example, measuring the capacity of a media server may aid in determining whether the server is likely capable of supporting its expected client population. That is, the media server's workload capacity can be evaluated, and from such evaluation the configuration of the media server (e.g., file structure, amount of memory, CPU, etc.) may be modified/optimized for supporting its expected client population. Thus, such measurement of the media server's capacity may enable evaluation and/or optimization of the media server's configuration for supporting an expected client population before actually implementing the media server in a client-server network. Further, after the media server is actually implemented, its capacity (e.g., its available capacity) may be monitored for supporting actual workloads applied thereto, and resources may be dynamically allocated in certain systems, such as in Utility Data Centers, for supporting the applied workloads.

Turning first to FIG. 1, an example client-server system 100 is shown in which embodiments of the present invention may be implemented. Client-server system 100 comprises a plurality of clients 104, 105, and 106, and a media server (or complex of media servers) 101. Clients 104-106 are each capable of communicatively accessing media server(s) 101 via communication network 103. Communication network 103 is preferably a packet-switched network, and in various implementations may comprise, as examples, the Internet or other Wide Area Network (WAN), an Intranet, Local Area Network (LAN), wireless network, Public (or private) Switched Telephony Network (PSTN), a combination of the above, or any other communications network now known or later developed within the networking arts that permits two or more computing devices to communicate with each other.

Media server(s) 101 of the illustrated embodiment comprise data storage 102 for storing streaming media files, such as File A, File B, and File C. Data storage 102 may comprise internal or external disk drives, floppy disks, optical disks, Compact Discs (CDs), Digital Versatile Discs (DVD), memory, and/or other data storage devices now known or later developed for storing digital data. In operation, a client may request a streaming media file available from media server 101, and such media server 101 may serve the streaming media file as a stream to the requesting client via communication network 103. That is, a client may request a particular content (e.g., audio, video, or other type of content) and media server 101 may serve a streaming media file as a stream to provide the requested content to the requesting client.

Media server 101 may comprise streaming media file(s) that is/are encoded for transmission at each of a plurality of different bit rates. For example, a streaming media file, File A, may comprise a particular content and it may be encoded for transmission at a plurality of different bit rates, such as 28 Kb/s, 56 Kb/s, and/or various other bit rates. Each resulting version of the file encoded for transmission at a given bit rate may be stored to data storage 102, e.g., File $A_1$ encoded for transmission at 28 Kb/s and File $A_2$ encoded for transmission at 56 Kb/s may each be stored to data storage 102 (note that files $A_1$ and $A_2$ comprise substantially the same content but are encoded for transmission at different bit rates, and thus the quality of each file may differ). As used herein, a file encoded for transmission at a particular bit rate may be referred to as a file encoded at the particular bit rate. In common phraseology in the art, a streaming media file is referred to as being "encoded at a particular bit rate", which means the file is encoded for transmission from the server at the particular bit rate. Thus, as used herein, the phrase "encoded at a bit rate" when describing a streaming media file means the streaming media file is encoded for transmission at the bit rate, as is consistent with common phraseology in the streaming media art.

Media server 101 generally attempts to serve the most appropriate encoded file to a client based at least in part on the client's access speed to the client-server network 103. For example, suppose client 104 has a 28 Kb/s speed connection to communication network 103, client 105 has a 56 Kb/s speed connection to communication network 103, and media server 101 comprises File $A_1$ encoded at 28 Kb/s and File $A_2$ encoded at 56 Kb/s stored to data storage 102; when client 104 requests the content of File A, media server 101 typically attempts to serve File $A_1$ to client 104 (as File $A_1$ is the highest-quality encoded file supportable by client 104's connection speed), and when client 105 requests the content of File A, media server 101 typically attempts to serve File $A_2$ to client 105 (as File $A_2$ is the highest-quality encoded file supportable by client 105's connection speed). However, in the above example, suppose that media server 101 does not have File A encoded at 56 Kb/s but instead comprises File $A_1$ encoded at 28 Kb/s and File $A_2$ encoded at 112 Kb/s; then upon client 105 requesting the content of File A, media server 101 typically attempts to serve File $A_1$ to client 105, as File $A_1$ is the highest-quality encoded file providing the requested content that is encoded at a suitable bit rate that client 105's connection can support.

Typically, a streaming media player is executed by the requesting client for playing the received stream. Various types of streaming media technologies exist. Popular streaming media players include those provided by RealNetworks™ (see http://www.realnetworks.com), such as its RealPlayer™ and RealOnePlayer™ streaming media players, and that used by Microsoft's Windows® Media Player (see http://www.microsoft.com), as examples. For instance, clients 104, 105, and 106 comprise streaming media players 104A, 105A, and 106A, respectively, executing thereon for playing received streams in the example of FIG. 1. Typically, each streaming media player has a buffer associated therewith, such as buffers 104B, 105B, and 106B shown in the example of FIG. 1, for buffering received streamed data to improve the continuity of the playback of such streamed data by the streaming media player.

As an example of a typical scenario for a user accessing an audio stream via the web, the user will typically use a web browser, such as Netscape's Navigator™, Microsoft's Internet Explorer™, or other web browser now known or later developed, to request access to audio content (e.g., a RealPlayer sound clip) by, for example, clicking a link to such audio content provided on a web page being served by a web server. Assuming, for instance, that the requested audio content is included in a RealPlayer sound file, the web server sends back to the browser a file called a RealPlayer metafile, which is a small text file that has the true location (e.g., the Universal Resource Locator (URL)) of the requested RealPlayer sound file and also has instructions instructing the web browser to launch the RealPlayer sound player. For instance, client 104 may submit request 107 for desired streaming audio content by, for example, clicking on a hyperlink to such streaming audio content. If a suitable streaming media player 104A (e.g., a RealPlayer media player in the above example) is not already executing on client 104, media server 101 may return instructions launching such streaming media player 104A.

The streaming media player 104A contacts the URL contained in the received metafile. It should be recognized that often the URL contacted for accessing the desired audio stream is not on the web server from which the audio file was requested. Rather, the audio stream is often on a different media server (e.g., a RealPlayer server in the above example) designed to deliver streaming media files. For instance, in FIG. 1, client 104 may access a web server (not shown) and a user may click on a hyperlink provided on a web page being served by such web server to request desired audio content. The web server may return a metafile to the client indicating the URL of the corresponding sound file and launching streaming media player 104A if it is not already executing. The URL of the sound file may identify media server 101, which is designed for delivering streaming media files, such as those stored to data storage 102, and streaming media player 104A may therefore contact media server 101 (via request 107 in this example).

Media server 101 (e.g., a RealPlayer server in this example) and streaming media player 104A (e.g., a RealPlayer media player in this example) may interact with each other so that the server knows at what speed client 104 is connected to the Internet. If the connection is a low-speed connection, a streaming audio file encoded at a lower bit rate is typically sent. This will generally be a file of lesser quality than a file encoded at a higher bit rate and destined for a high-speed connection. If a high-speed connection is used, a larger, higher-quality sound file encoded at a higher bit rate is typically sent, which will generally provide for better sound quality. The requested audio file is then sent in Internet Protocol (IP) packets, typically using either the User Datagram Protocol (UDP) or the Internet's normal Transmission Control Protocol (TCP). UDP does not keep re-sending packets if they are misplaced or other problems occur, as does TCP, which may be preferable for certain streaming media technologies.

Thus, media server 101 serves the requested audio content to client 104 as stream 108. The packets are sent to buffer 104B on client 104, and once the buffer is filled, the packets begin being sent from the buffer to streaming media player 104A and it begins playing the audio file. As the file is being played remaining portions of the file are still transmitted from media server 101 to client 104 and are buffered in buffer 104B. If packets are not replenished to buffer 104B fast enough, then interruptions in the playback by the streaming media player 104A may occur, thus degrading the quality of the audio stream perceived by the user.

Steaming video may be communicated from media server 101 to a client in a similar manner as that described above for streaming audio. For instance, client 105 may submit request 109 for desired streaming video content. The requested video file is then sent in IP packets, typically using UDP. Thus, media server 101 serves the requested video file to client 105 as stream 110. The packets are sent to buffer 105B, and once the buffer fills up, the video begins being played by streaming media player 105A. As the file is being played, remaining video packets of the file are still transmitted from media server 101 to client 105 and are buffered in buffer 105B. If packets are not replenished to buffer 105B fast enough, then interruptions in the playback by streaming media player 105A may occur, thus degrading the quality of the video stream perceived by the user. Once all of the video data has been received and played by streaming media player 105A, the video stops. The video file generally does not remain on the client's system, but rather each section of the file is typically discarded after it is played.

As further shown in FIG. 1, client 106 may request streaming media content (e.g., a streaming audio and/or video file) from server 101 via request 111, and media server 101 may provide the requested content as stream 112 to client 106. While three clients are shown in this example, it should be recognized that many more clients may, in certain implementations, be concurrently accessing one or more streaming media files from media server 101. As described above, limits exist as to how many concurrent streams media server 101 can support for a given client population. Thus, it becomes desirable to measure the capacity of a media server for supporting workloads applied thereto. Further, a question arises: what are the scaling rules for server capacity when delivering media content encoded at different bit rates? For example, if a media server is capable of delivering N concurrent streams encoded at 500 Kb/s, will this server be capable of supporting 2×N concurrent streams encoded at 250 Kb/s?

Further, while a client requests streaming media content in each of the above examples, it should be recognized that in some implementations a streaming media file may be "pushed" from media server 101 to a client without the client specifically requesting such file. For instance, upon a client visiting a particular web page, the web page may cause a streaming media file (e.g., an advertisement) to be sent to the client. It should be understood that embodiments of the present invention are applicable to any such utilization of streaming media.

While examples of streaming media technologies, such as typical techniques for accessing RealPlayer streaming media files, are described above, it should be recognized that the present invention is not limited to a specific type of streaming media technology. Further, while examples of streaming audio and streaming video files are described above, the present invention is not limited solely to such types of streaming media, but rather any type of streaming file is intended to be within the scope of the present invention.

Figure 2:
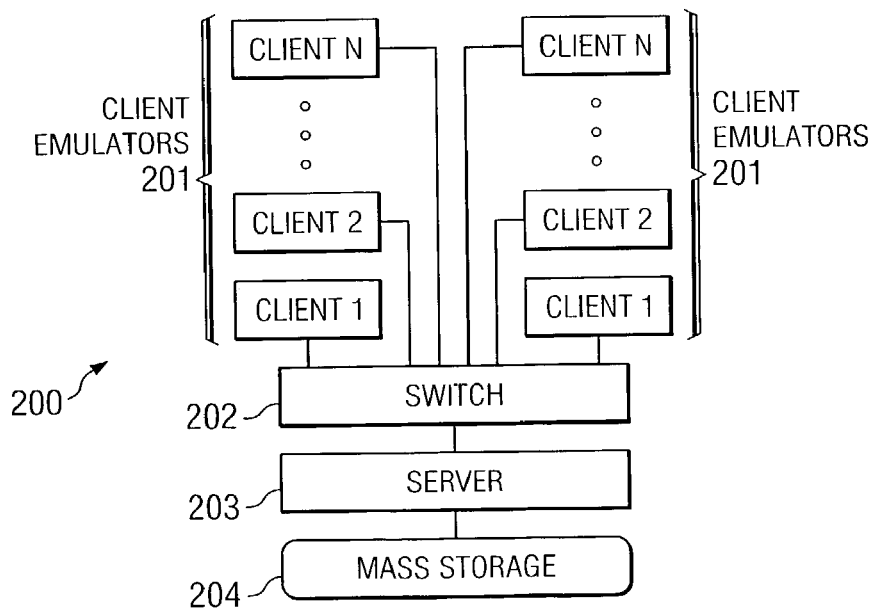
FIG. 2 shows an example experimental testbed arrangement that may be used by certain embodiments of the present invention for measuring the capacity of a media server.

As described briefly above, embodiments of the present invention provide a technique for measuring the capacity of a media server for supporting various workloads of concurrent streaming media accesses by a population of clients. Turning now to FIG. 2, an example experimental testbed arrangement is shown, which may be used by certain embodiments for measuring the capacity of a media server. Testbed arrangement 200 may be used to measure the capacity of a particular server 203 in accordance with the techniques described herein. For example, testbed arrangement 200 may implement techniques described herein for measuring the capacity of server 203 before implementing such server 203 for handling actual workloads to determine whether server 203 will likely be able to support expected workloads. As shown, a population of clients 201 are emulated, which are capable of accessing server 203 via switch 202 for requesting streaming media files. Mass storage 204 is communicatively coupled to server 203 for storing a plurality of different streaming media files.

In a specific example implementation of testbed 200, server 203 is a RealPlayer 2450 system having the following configuration: a 1-way 550 megahertz (MHz) PA 8600 processor, 4 gigabyte (GB) memory, 2 1000SX Ethernet Input/Output (I/O) cards, 4 Ultra2 SCSI port on 2 dual port cards, disk configuration includes 4 by 15K rpm 18.2 CB disks 4-way striped using HP-UX LVM, HFS file system with block size configured to 64 KB, and HPUX 11.0 operating system. The media server also comprises RealServer 8.0 media server software from RealNetworks. Further, in this specific example, 14 client machines are implemented as RealPlayer 2450 systems with 2-way 550 MHz PA 8600 processors, running HPUX 11.0 operating system. The 14 client machines of the illustrated embodiment are connected to server 203 by a Gbit switch 4108gl via 1 Gb/s links, and each client machine may execute software for emulating a plurality of clients (e.g., each machine may emulate up to 200 clients in certain implementations).

While an example of a specific testbed configuration is described above, it should be understood that embodiments of the present invention are not limited in application to any given testbed configuration, but rather may be implemented with any testbed configuration suitable for measuring the capacity of a media server in accordance with the techniques described herein. Further, the specific testbed configuration described above has been tested using techniques described herein, and specific results obtained when testing under that example testbed configuration are provided herein below to further explain aspects of a preferred technique for measuring the capacity of a media server. Thus, this specific testbed configuration is intended solely as a concrete example for illustrative purposes, and is not intended to be limiting on the scope of the present invention in any way.

The configuration and the system parameters of the testbed setup are preferably chosen to avoid some trivial bottlenecks when delivering multimedia applications, such as limiting I/O bandwidth between server 203 and storage system 204 or limiting network bandwidth between server 203 and clients 201. As described further hereafter, initial testing of the above-described testbed configuration has shown that achievable bandwidth under the maximum server workload is significantly lower than the physical bandwidth of communication links available in the system. Such system configuration exposes the performance limits specific to application itself, and allows more general conclusions to be derived about its performance. In a preferred experimental setup, the general-purpose components available in a Utility Data Center environment are used, which typically uses a Storage Area Network (SAN)-based storage solution.

In performing workload tests for measuring the capacity of server 203 for supporting workloads, the emulated clients are instructed to make a predefined number of requests for a certain set of files from server 203. The emulator software has the flexibility of allowing different clients to request different files. Additionally, different emulators may be configured with their own specific parameters as for the number of streams as for a set of requested files. These capabilities provide a convenient way to imitate a wide range of realistic workloads of interest.

Turning to FIG. 3, an operational flow diagram is shown illustrating a technique for measuring the capacity of a media server under a realistic workload applied thereto in accordance with an embodiment of the present invention. More specifically, the technique described in conjunction with FIG. 3 enables the capacity of a media server, such as media server 203 of FIG. 2, to be measured under a workload applied thereto, wherein such workload may comprise a plurality of different clients concurrently accessing various different streaming media files encoded at different bit rates via different speed connections to the client-server network (e.g., the Internet). Under a realistic workload, various clients access the client-server network via different speed connections. For instance, a first segment of the population of clients accessing the media server may have dial-up modem connections enabling access at the rate of 28 Kb/s, a second segment of the population of clients accessing the media server may have dial-up modem connections or ISDN connections enabling access at the rate of 56 Kb/s, a third segment of the population of clients accessing the media server may have dual-ISDN connections enabling access at the rate of 112 Kb/s, a fourth segment of the population of clients accessing the media server may have cable modem connections enabling access at the rate of 256 Kb/s, a fifth segment of the population of clients accessing the media server may have DSL connections enabling access at the rate of 350 Kb/s, and a sixth segment of the population of clients accessing the media server may have very high-bandwidth connections enabling access at the rate of 500 Kb/s. Further, certain ones of the client population may be accessing a first streaming media file, while other ones of the client population are accessing various other streaming media files from the media server concurrently. Accordingly, the technique described in conjunction with FIG. 3 enables measuring of the server's capacity for supporting streams under a realistic (e.g., a "mixed") workload applied thereto.

In operational block 301, a basic benchmark is executed for each of various different encoding bit rates for files stored at media server 203. An objective of the basic benchmark according to one embodiment is to define how many concurrent streams of the same bit rate can be supported by media server 203 without degrading the quality of any streams. Preferably, the basic benchmark comprises two types of benchmarks: 1) a Single File Benchmark, and 2) a Unique File Benchmark. Thus, in operational block 301A, a Single File Benchmark (SFB) is executed for each of various different encoding bit rates for files stored at media server 203. The SFB measures the media server capacity when all of the clients 201 in the test are accessing the same file. That is, the result of the SFB for a particular encoding bit rate defines the maximum number of concurrent streams of a single file encoded at that particular bit rate that media server 203 can support. Example techniques for executing SFBs for media server 203 are described in further detail below.

In operational block 301B, a Unique File Benchmark (UFB) is executed for each of various different encoding bit rates for files stored at media server 203. The UFB measures the media server capacity when all of the clients 201 in the test are accessing different files. That is, the result of a UFB for a particular encoding bit rate defines the maximum number of concurrent streams, each of different files that are encoded at the particular bit rate, that media server 203 can support. Example techniques for executing UFBs for media server 203 are described in further detail below.

As described in greater detail below, when all clients 201 are accessing a single file (as measured by the SFB), media server 203 is capable of serving the currently streamed bytes of the file from memory. However, when all clients 201 are accessing a different file (as measured by the UFB), media server 203 serves each file from disk. Thus, the SFB is essentially a best-case scenario benchmark, whereas the UFB is essentially a worst-case scenario benchmark.

In operational block 302, the basic benchmark (e.g., SFBs and UFBs) are used to derive cost functions for streams supported by media server 203. That is, a preferred embodiment of the present invention derives cost functions for computing the cost to the media server's resources resulting from streams being served by the media server under an applied workload. Example techniques for deriving such cost functions are described in further detail herein below.

In operational block 303, the derived cost functions are used to compute a Load of media server 203 for a workload "W" that is applied to the media server. That is, for an applied workload "W" (e.g., a number of concurrent streams for a population of clients accessing streaming media file(s)), a Load corresponding to the amount of media server resources consumed for supporting the applied workload is computed. Example techniques for computing the Load of media server 203 under an applied workload are described in further detail herein below.

In operational block 304, the computed Load is evaluated to determine the media server's available capacity and/or whether the media server is overloaded. That is, the Load is evaluated to determine whether, for the applied workload "W", media server 203 is overloaded (such that it is unable to support the workload) and/or the available capacity, if any, of media server 203. Example techniques for using the Load of media server 203 for evaluating the media server's capacity (available and/or consumed capacity) are described further below. As described above, the computed measurement of a media server's capacity for supporting concurrent streams under an applied workload may be used for evaluating the media server before actually implementing the server in a client-server network (e.g., to determine whether the server will be capable of supporting an expected population of clients), and/or such computed measurement may be made for actual applied workloads to the server after its implementation in a client-server network (e.g., to dynamically allocate the proper resources to the media server for supporting the applied workload).

As described above in conjunction with block 301 of FIG. 3, in a preferred embodiment a set of capacity metrics and basic benchmarks are used for determining the performance limits of media server 203 and analyzing its main performance bottlenecks. The primary objective of the basic benchmark is to define how many concurrent streams of the same bit rate can be supported by media server 203 without degrading the quality of any streams. Thus, the basic benchmark may be executed for various different encoding bit rates at which streaming media files stored to media server 203 may be encoded.

In a testing technique used for testing media server 203 in the example specific testbed configuration described above, 20 minute video clips encoded at different bit rates created with RealProducer G2 from RealNetworks were used for executing the basic benchmarks. The results are described below for illustrative purposes. It should be understood that embodiments of the present invention are not limited in application to the specific configuration and streaming media files used in the testbed in this example, but rather this example is provided solely for illustrative purposes to aid in explanation and appreciation of various features and advantages of the testing technique of a preferred embodiment. While embodiments of the present invention are not limited to streaming media files of a particular size, it should be understood that for accurate testing it is preferable to utilize a streaming media file that is of a suitable size for truly measuring the capacity of the media server. For instance, the streaming media file utilized for testing is preferably significantly larger than the buffer of the clients' media player. If, for example, the media player's buffer is capable of storing 30 seconds of play time, then a streaming media file that is 45 seconds long, for instance, will likely not accurately reflect the server's capacity for supporting a workload because the majority of the streaming media file can be played from the media player's buffer. Rather, a streaming media file of 10 to 20 minutes in this instance would more accurately test the server's capacity and provide a more accurate determination of whether rebuffering events are encountered (in which the buffers are emptied because the media server is unable to replenish data to the buffers fast enough).

In the example testing technique, the following six encoding bit rates were chosen to represent the typical needs of the Internet audience:

28 Kb/s for analog modem users,
56 Kb/s for analog modem and ISDN users,
112 Kb/s for dual-ISDN users,
256 Kb/s for cable modem users,
350 Kb/s for DSL/cable users, and
500 Kb/s for high-bandwidth users.

Of course, various other bit rates in addition to or instead of the above encoding bit rates may be used in alternative implementations, and any such alternative implementation is intended to be within the scope of the present invention. Preferably, sufficient bit rates are used for covering the encoding bit rates most likely to be encountered in files stored to the media server 203 under test.

In the experimental setup of a preferred embodiment, two main performance metrics are used to determine whether server 203 has reached its maximum capacity for the applied workload. That is, in determining the results of SFBs and UFBs for media server 203, two performance metrics are preferably used. One of these metrics is collected at the media server side 203 and the other one is collected at the client side 201. These metrics are complementary. Typically, the server-side metric reliably reflects the server state and can be used alone to determine whether the server capacity for an applied workload is exceeded. As described further below, when the network bandwidth in the measurement testbed 200 is a limiting performance bottleneck, the combined information from the server-side and the client-side metrics helps to reveal this bottleneck. The client-side metric is useful to double check that the achieved server capacity does not degrade the quality of delivered streams. Additionally, the client-side metric helps to evaluate the fairness of media service for "mixed" workloads and answer more specific questions such as: once media server 203 gets to an overload state, which streams are experiencing the server overload and as a result have a degrading quality of service.

As for the server-side metric, which may be referred to herein as a Server Overload Metric, media server 203, such as a RealServer media server, can typically be configured to report a set of useful statistics (ServerStats) about its current state. The default value for a reporting interval is 3 seconds, and while that value (as well as various other values) is suitable, a 10 second value is used in the specific example experimental setup 200. Of course, any suitable reporting interval may be used in alternative implementations, and any such implementation is intended to be within the scope of the present invention. In particular, ServerStats may provide information on:

the number of streams currently playing by server 203;
the aggregate bandwidth requirements of currently accepted streams,
the average bandwidth delivered by server 203 during the reporting interval,
the number of packets sent by server 203 during the reporting interval,
the number of packets being sent late against the application target time but still in time: a warning information, and
the number of packets being sent with violation of the real-time constraints: an alarming information about server 203 being in an overload state.

The above list is not exhaustive of the ServerStats that are typically available, but these include a few of the statistics that are observed during the stress tests of a preferred embodiment for server monitoring.

To determine whether the server capacity is reached (e.g., in testing the media server under the SFBs and UFBs), a Server Overload Metric is preferably used, which provides information about the packets sent with violation of "on-time delivery." These packets are indicative of server 203 being overloaded and that its available capacity is exceeded.

The client-side metric may be referred to herein as a Degraded Stream Quality Metric. On the client side 201, whether a client has entered a rebuffering state is of interest. Entering a rebuffering state means:

the current "play" buffer is empty,
the client has stopped playing, and
the client waits until the "play" buffer is filled to an acceptable level to continue play back.

In a preferred implementation, client-side software of an embodiment of the present invention, referred to herein as ClientStats, is used to monitor the client state and to observe:

the number of rebuffering events: how many times the client entered a rebuffering state, and
the statistics on the average stream bandwidth received by the client.

Given the above-described capabilities of the ClientStats software, it is within the ability of one of ordinary skill in the art to develop such a software program without undue experimentation, and therefore implementation of such ClientStats software is not described further herein so as not to cloud other aspects of embodiments of the present invention. Further, as mentioned above, the client-side metric may not be utilized in all embodiments of the present invention, but rather in some embodiments. Accordingly, the server-side metric may be utilized without the complementary information from the client-side metric for measuring the server's capacity under an applied workload.

In the experimental testbed arrangement 200 in which the communication infrastructure between server 203 and clients 201 is not a limiting resource, the existence of rebuffering events on the client side reflects a degrading quality of the delivered streams as a result of server 203 being overloaded. The Degraded Stream Quality Metric (or "client-side metric") serves as a complementary metric to the Server Overload Metric (or "server-side metric") for determining whether the media server capacity has been exceeded.

As described above, in a preferred embodiment basic benchmarks are executed such that each comprise a Single File Benchmark (SFB) and a Unique File Benchmark (UFB). Again, a goal of the basic benchmarks according to an embodiment of the invention is to define how many concurrent streams of the same bit rate can be supported by media server 203 without degrading the quality of streams. Thus, in a preferred embodiment, the result of a basic benchmark is determined for each of the encoding bit rates being tested (e.g., for each of the six encoding bit rates identified above). As described further below, preferably the Server Overload Metric and Degraded Stream Quality Metric are used in testing media server 203 to determine the results of its SFB and UFB for each of the various different encoding bit rates.

The SFB measures the media server capacity when all of the clients in the test are accessing the same file. In a preferred implementation, the SFB is a completely automatic benchmark which runs a sequence of tests with an increasing number of clients 201 requesting the same file from server 203 for each of the six encoding bit rates (or any other number of encoding bit rates desired to be tested in alternative implementations). During each test, the following performance data and measurements are preferably collected:

ServerStats,

ClientStats, general performance information of a server machine using the well-known vmstat, and general performance information of the client machines using the well-known vmstat.

Turning to FIG. 4, an example operational flow diagram for determining SFBs for media server 203 in accordance with a preferred embodiment of the present invention is shown. As shown, operation begins in operational block 401, and in operational block 402 the file encoding bit rate is set to a first bit rate (i.e., encoding bit rate $X=X_1$) for an initial number of clients 201. For instance, the encoding bit rate may be set to 28 Kb/s, and the initial number of clients 201 may be set to two (of course, the initial number of clients may start at any suitable number, including without limitation one client). In operational block 403, the clients 201 request the same file, which is encoded at the first bit rate, from media server 203. That is, in operational block 403, clients 201 begin concurrently accessing the same file from media server 203, which is a file encoded at the set bit rate (e.g., 28 Kb/s). Preferably the file system of media server 203 is unmounted and mounted back just before execution of block 403 (although not specifically shown in the operational flow of FIG. 4) to ensure that the requested streaming media file (e.g., video clip) is not initially present in the media server's memory (e.g., cache) but is instead required to be retrieved from disk. Of course, because all of clients 201 are requesting access to the same file in testing for the SFB, once media server 203 retrieves the file from disk for one client, it can be served from the media server's memory in serving the other clients.

In operational block 404, server performance data is collected for media server 203 in servicing the clients 201. More specifically, in a preferred embodiment ServerStats (e.g., Server Overload Metric), ClientStats (e.g., Degraded Stream Quality Metric), as well as general performance information of a server machine using the well-known vmstat and general performance information of the client machines using the well-known vmstat, are collected, as described above.

In operational block 405, a determination is made whether the maximum capacity of media server 203 is exceeded. That is, the collected performance data is evaluated to determine whether the media server's maximum capacity was exceeded in servicing the clients requesting access to the same file in block 403. Such a determination may be made, for example, by evaluating, among other things, the Server Overload Metric, which provides information about the number of packets sent with violation of "on-time delivery." For instance, if an unacceptably high number of packets were sent with violation of "on-time" delivery, then it may be determined that the server's maximum capacity is exceeded under the applied workload.

If it is determined in block 405 that the media server's maximum capacity was not exceeded, then operation advances to block 406 whereat the number of clients 201 is increased. The number of clients may be increased by any suitable amount under various testing strategies (e.g., increased by 1 or more). That is, because media server 203 was capable of supporting the initial number of clients 201 requesting access to the same file at the set access bit rate (e.g., 28 Kb/s), the number of clients 201 is then increased to re-test the media server 203 to determine whether it can support this greater workload. Accordingly, from block 406, operation returns to block 403 whereat the clients 201 (now increased in number) request access to the same file from media server 203. As mentioned above, preferably the file system of media server 203 is again unmounted and remounted before execution of block 403 (although not specifically shown in the operational flow of FIG. 4) to ensure that the requested streaming media file (e.g., video clip) is not initially present in the media server's memory (e.g., cache) but is instead required to be retrieved from disk. Of course, because all of clients 201 are requesting access to the same file in testing for the SFB, once media server 203 retrieves the file from disk for one client, it can be served from the media server's memory in serving the other clients.

Once it is determined in operational block 405 that the media server's maximum capacity is exceeded (i.e., that media server 203 is overloaded and is unable to support the workload applied to it), execution advances to block 407. At block 407, the result of the SFB for the access bit rate being tested (e.g., 28 Kb/s) is set. More specifically, the capacity of media server 203 under the SFB for the access bit rate being tested (e.g., 28 Kb/s) is set to the maximum number of concurrent client accesses for which media server 203 was capable of supporting streams (e.g., the previous number of concurrent clients 201 that did not result in the maximum server capacity being exceeded in block 405).

In operational block 408, a determination is made as to whether the SFB for the maximum encoding bit rate to be tested has been executed. That is, it is determined whether all of the encoding bit rates of interest (e.g., all six access bit rates in the above example) have been tested under the SFB. If not, then operation advances to block 409 whereat the encoding bit rate is set to the next bit rate to be tested (e.g., increased from 28 Kb/s to 56 Kb/s). In operational block 410, the number of clients 201 to be used for testing is reset to the initial number (e.g., to two clients), and operation then returns to operational block 403 and testing of media server 203 continues in the manner described above for the initial encoding bit rate (e.g., 28 Kb/s) in order to determine the results of the SFB for this next encoding bit rate (e.g., 56 Kb/s). Once it is determined in operational block 408 that the results of the SFB has been determined for all of the encoding bit rates of interest (e.g., for all of the encoding bit rates of media files stored at media server 203), then operation ends at block 411. Thus, upon completion of block 411, the results of an SFB have been determined for media server 203 for each of various different media file encoding bit rates (e.g., 28 Kb/s, 56 Kb/s, etc.).

While the maximum achievable media server capacity depends on the encoding bit rate of the streaming file, the performance data collected at server 203 and clients 201 (in operational block 404) are similar. Using as two representative examples files encoded at 112 Kb/s and 350 Kb/s, the below sample results show more detail about the performance of the specific example server configuration identified above, its limits and bottlenecks under the SFB.

For a file encoded at 112 Kb/s, this specific example of media server 203 reaches its capacity at 1350 concurrent streams (e.g., streams being provided concurrently to 1350 clients), and for a file encoded at 350 Kb/s this specific example of media server 203 reaches its capacity at 500 concurrent streams. The point at which the media server 203 reaches its capacity with the SFB for each bit rate is determined by the Server Overload Metric and the complementary Degraded Stream Quality Metric, as described above.

It should be observed that the media server capacity scales differently than the encoding bit rates of the underlying files: the difference in encoding bit rates between 112 Kb/s file and 350 Kb/s file is 3.125, while the difference in server capacity for corresponding bit rates is only 2.7. Intuitively, media server 203 incurs an additional overhead while handling a higher number of concurrent streams encoded at a lower bit rate compared with handling a smaller number of concurrent streams encoded at a higher bit rate (even for a case, when the aggregate bandwidth requirements of the delivered streams are the same).

Figure 5A:
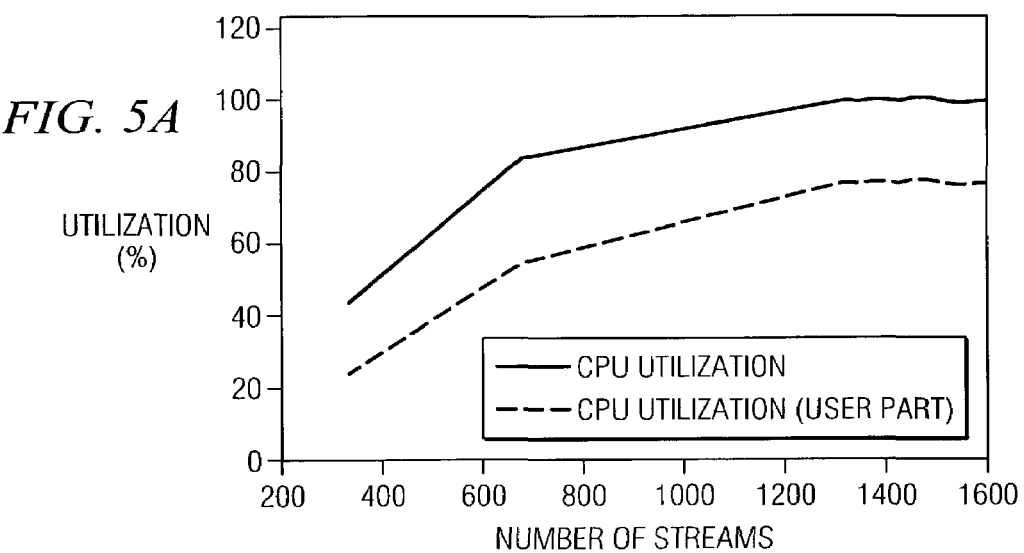
FIGS. 5A and 5B show graphs illustrating the CPU utilization of an example media server of FIG. 2 under SFB tests conducted according to the operational flow of FIG. 4 at 112 Kb/s and 350 Kb/s, respectively.
Figure 5B:
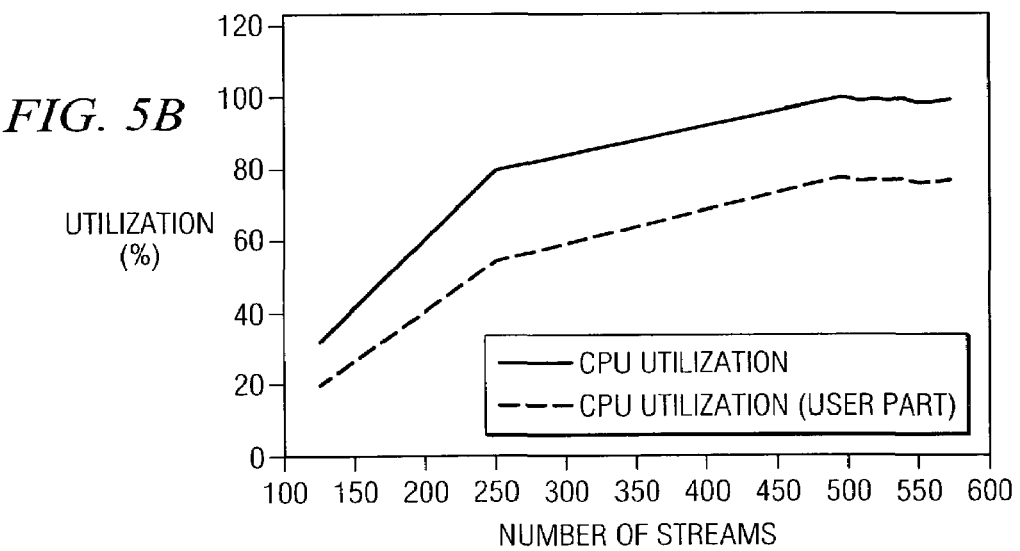

FIGS. 5A and 5B show graphs illustrating the CPU utilization and the application related part of it for the 112 Kb/s and 350 Kb/s tests, respectively. Both figures look similar. Under the SFB, the media server 203 is CPU bounded: CPU utilization reaches 100%. It is the main resource limiting server performance. Again, it should be recalled that because all clients 201 are accessing the same file under the SFB, media server 203 is capable of servicing all but the first request from memory. Thus, CPU utilization of media server 203 is the primary limiting resource when evaluating the SFB.

The shape of the CPU utilization curve is not linear for both encoding bit rates shown in FIGS. 5A and 5B. During the first half of the server capacity load, the CPU utilization grows linearly and reaches nearly 85%. The second half of the server capacity is achieved by utilizing the remaining 15% of the CPU resources, and finally, when the CPU utilization reaches 100%, it becomes a limiting factor of the media server performance.

Often, the utilization of a bottlenecked resource is used to build a simple normalized performance model of a corresponding system or application. For example, a system capacity achievable at 100% utilization of a bottleneck resource represents a 100% of the applied load. Then at 50% utilization of a limiting resource a system can process 50% of an applied load (i.e., 50% utilization of a bottlenecked resource corresponds to 50% of server capacity). The shape of the CPU utilization curve in FIGS. 5A and 5B overwrites an existence of such a simple performance model for the streaming media server (even for a case when a workload is delivered from memory).

Figure 6A:
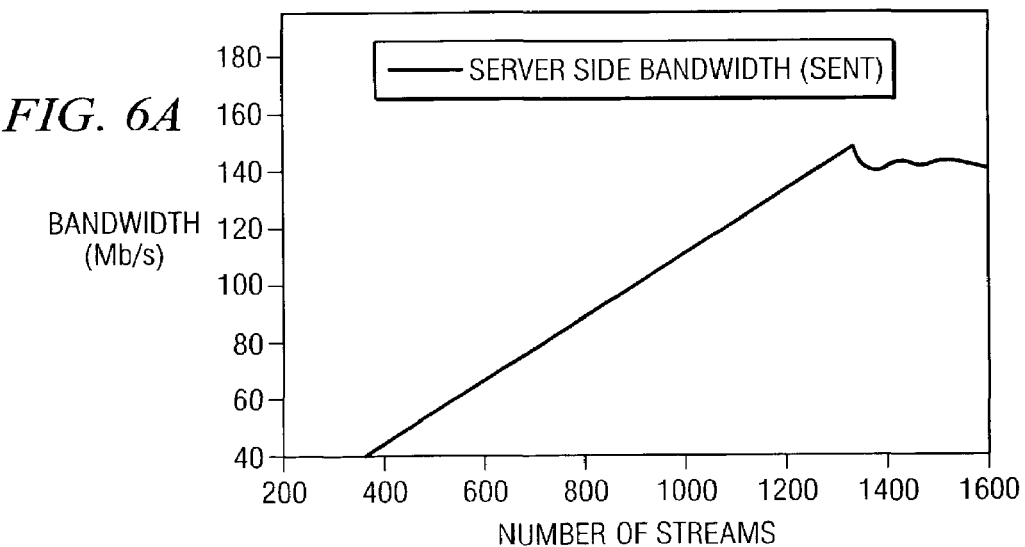
FIGS. 6A and 6B show graphs illustrating the overall bandwidth in megabits per second (Mb/s) delivered at the server side in SFB tests conducted according to the operational flow of FIG. 4 on the example media server of FIG. 2.
Figure 6B:
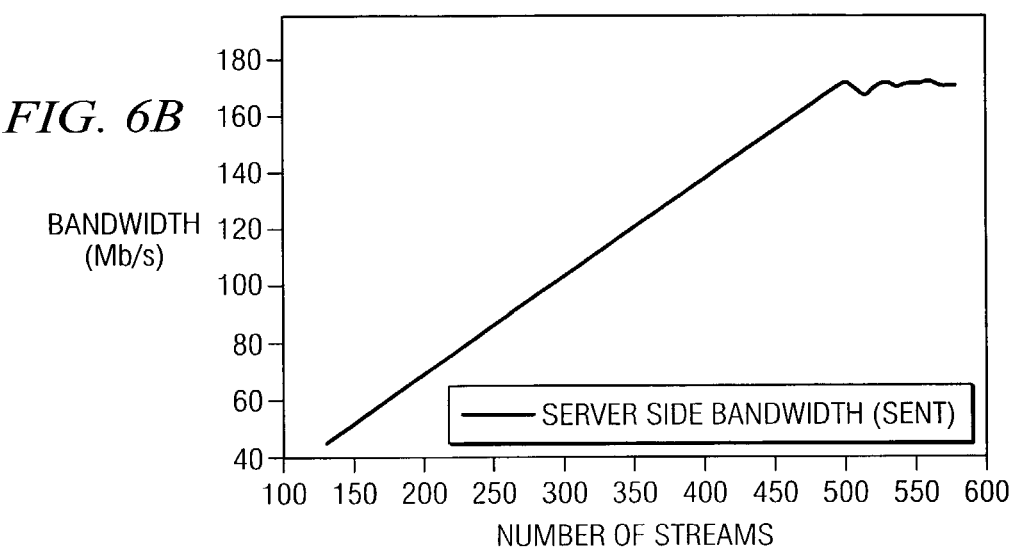

FIGS. 6A and 6B show graphs illustrating the overall bandwidth in megabits per second (Mb/s) delivered at the server side 203. It grows linearly, until the server capacity is reached, and after that, bandwidth delivered by server 203 flattens. For a SFB and a file encoded at 112 Kb/s, the bandwidth delivered by server 203 peaks at 151.2 Mb/s (as shown in FIG. 6A), and for a file encoded at 350 Kb/s, the maximum delivered bandwidth is 175 Mb/s (as shown in FIG. 6B). Thus, the bandwidth delivered by media server 203 is far smaller than the capacity of the server network connections: media server 203 is connected to clients 201 via 2×1 Gb/s links in this specific example testbed configuration.

Figure 7A:
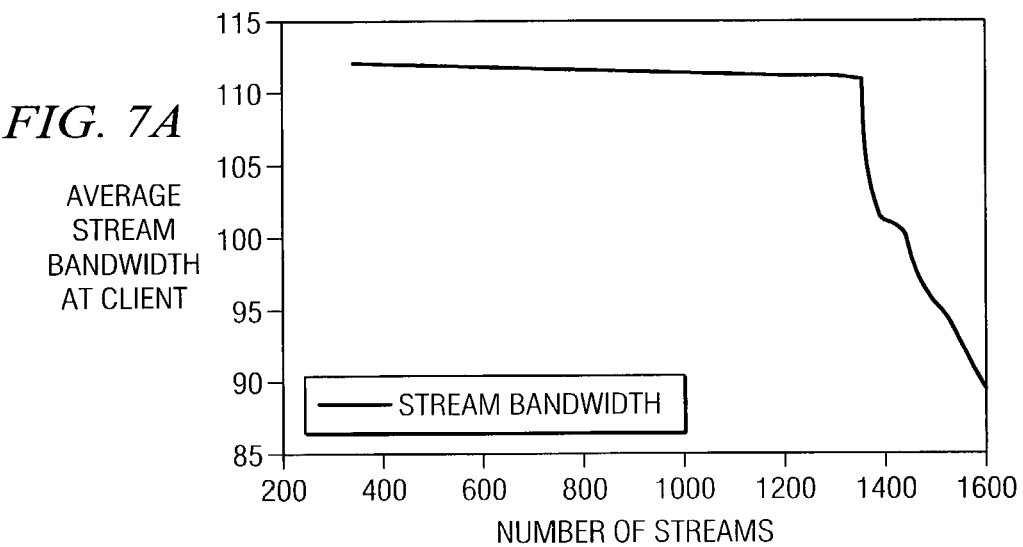
FIGS. 7A and 7B show graphs illustrating complementary information from the client side in the SFB tests conducted according to the operational flow of FIG. 4 on the example media server of FIG. 2.
Figure 7B:
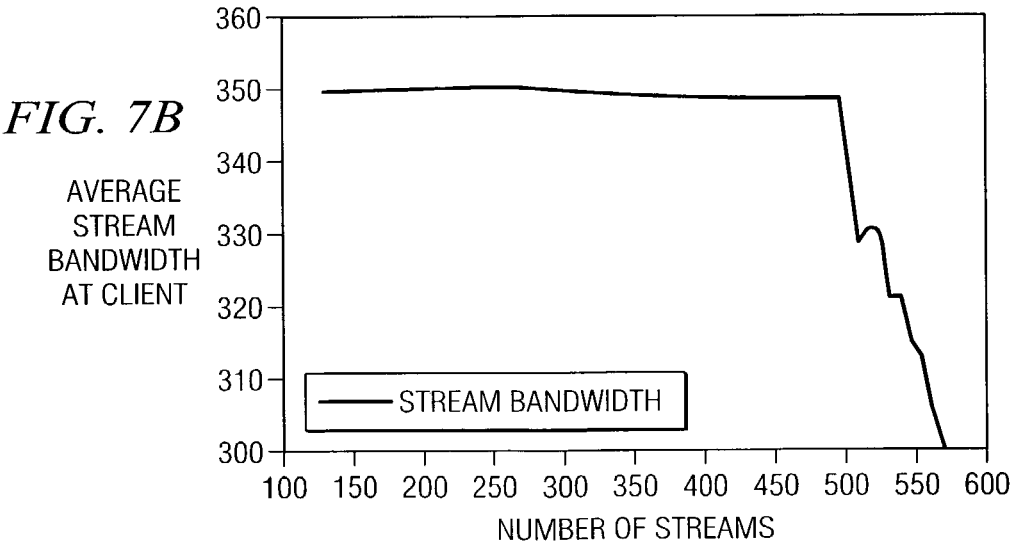

FIGS. 7A and 7B show graphs illustrating complementary information from the client side 201. It should be recognized that once the server capacity is reached, the quality of the streams starts to degrade significantly. For instance, once the server capacity is reached, 10% of extra workload causes around 9% of stream bandwidth degradation in this example.

The set of graphs in FIGS. 6A-6B and 7A-7B aid in predicting the quality of service implications under a server overload condition. A typical media server application does not have a "built-in" admission control mechanism. Since a maximum server capacity defines the maximum bandwidth server 203 can deliver at a particular bit rate, any accepted load in addition to a basic server capacity results in degradation of delivered stream quality: X % of additional load causes $$\frac{100 \times X}{(100 + X)} \%$$

of degradation in delivered stream bandwidth. Thus, measurements of media server performance under a set of basic workloads provide useful insights into the specifics of application behavior under overload conditions which can be used in the design of an efficient admission control strategy for media servers. Utility-aware services typically require a certain level of quality guarantees. Understanding the relationship between the server overload and quality of service (QoS) of delivered streams is advantageous for implementing such guarantees.

Figure 8A:
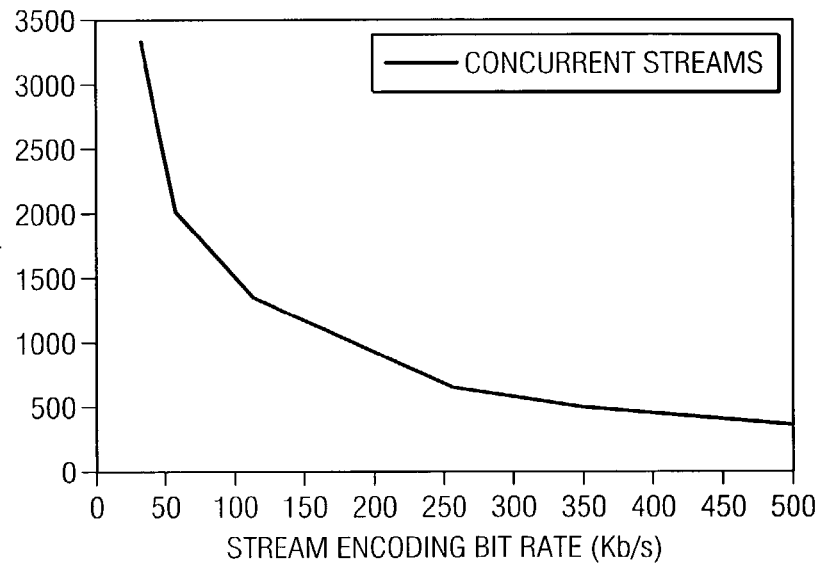
FIG. 8A shows a graph illustrating the maximum capacity in concurrent streams achievable by the example media server of FIG. 2 across six different encoding bit rates under SFB testing according to the operational flow of FIG. 4.
Figure 8B:
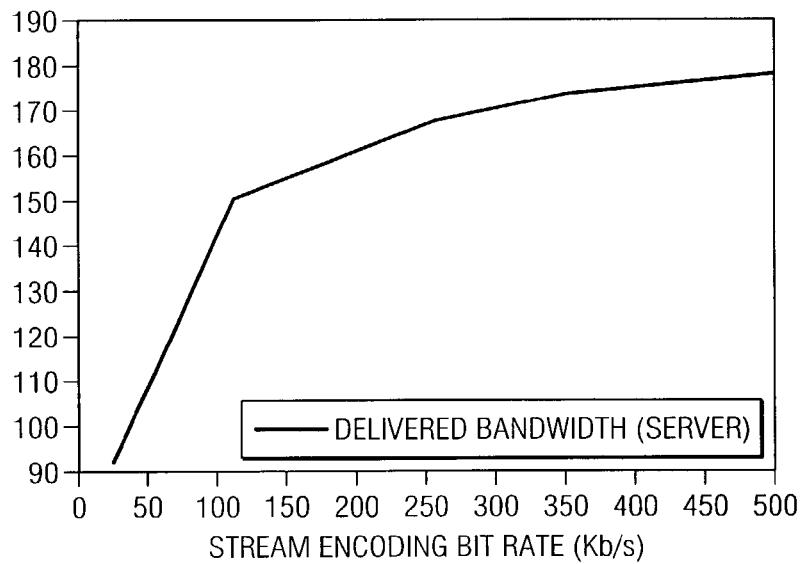
FIG. 8B shows a graph illustrating the corresponding maximum bandwidth in Mb/s delivered by the example media server of FIG. 2 across the six different encoding bit rates under SFB testing according to the operational flow of FIG. 4.

FIG. 8A presents a graph illustrating the maximum capacity in concurrent streams achievable by this specific example configuration of streaming media server 203 across six different encoding bit rates under the SFB. FIG. 8B shows a graph illustrating the corresponding maximum bandwidth in Mb/s delivered by the media server 203 for the different encoding bit rates. The shape of the curve is interesting: for higher encoding bit rates the difference in achievable bandwidth is much less significant than for lower bit rates. Many admission control strategies proposed in prior literature use the "fixed" maximum bandwidth a server is capable to deliver as a main "scheduling" resource for admission of a new stream. Evidently, the amount of bandwidth a server is capable to deliver is variable and depends on the encoding bit rates of current streams in progress, however, as illustrated by the examples of FIGS. 8A-8B.

Figure 9:
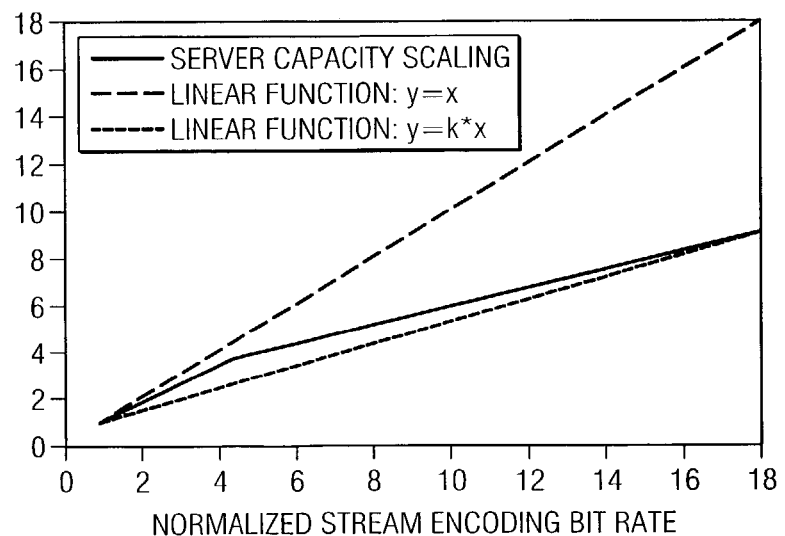
FIG. 9 shows a normalized graph reflecting the scaling rules for the media server capacity under SFB testing according to the operational flow of FIG. 4 across various different encoding bit rates for the example media server of FIG. 2.

FIG. 9 shows the normalized graph reflecting the scaling rules for the media server capacity under the SFB and different encoding bit rates. In FIG. 9, point (1,1) presents the maximum capacity (360 concurrent streams) achievable by the server 203 when all the clients 201 in the test are accessing the same file encoded at a 500 Kb/s bit rate. Each absolute value for the other encoding bit rates is normalized with respect to it. For example, the maximum capacity achievable by the server 203 under SFB and a 28 Kb/s encoding bit rate is 3300 concurrent streams and is represented by a point (17.9, 9.2) in the graph of FIG. 9.

FIG. 9 reflects that the server capacity scaling rules are non-trivial. For example, the difference between the highest and lowest bit rate of media streams used in the above experiment is about 18 times. However, the difference in maximum number of concurrent streams the server is capable of supporting for corresponding bit rates is only around 9 times. FIG. 9 shows that the media server capacity scales non-linearly compared to the encoding bit rates of the underlying files being accessed.

In summary, under the SFB only one stream reads a file from the disk, while all the other streams read the corresponding bytes from the file buffer cache of media server 203. Thus, practically, this benchmark measures the streaming server capacity when the media content is delivered from memory. However, it is not necessary that the streamed media file completely resides or fits in the memory. In essence, this benchmark exercises the shared access by multiple clients 201 to the same file.

In a preferred embodiment, a Unique File Benchmark (UFB) is also determined, which measures the media server capacity when each client in the test is accessing a different (unique) file. In a preferred implementation, the UFB is a completely automatic benchmark which runs a sequence of tests with an increasing number of clients 201 requesting different files from server 203 for each of the six encoding bit rates (or any other number of encoding bit rates desired to be tested in alternative implementations). For example, for a test point with N different clients, each file from the original basic set of files on media server 203 is replicated N times correspondingly, where different copies of the file are given different file names. To make sure that none of the video clip data are present in the file buffer cache (memory), and all the files are streamed from the disk, the file system of media server 203 is preferably unmounted and mounted back before each test point.

Turning to FIG. 10, an example operational flow diagram for executing UFBs for media server 203 in accordance with a preferred embodiment of the present invention is shown. As shown, operation begins in operational block 1001, and in operational block 1002 the encoding bit rate is set to a first bit rate (i.e., bit rate $X=X_1$) for an initial number of clients 201. For instance, the encoding bit rate may be set to 28 Kb/s, and the initial number of clients 201 may be set to two (of course, the initial number of clients may start at any suitable number, including without limitation one client). In operational block 1003, clients 201 each request a different file from media server 203. That is, in operational block 1003, clients 201 begin concurrently accessing different files that are encoded at the set encoding bit rate (e.g., 28 Kb/s) from media server 203. As mentioned above, preferably the file system of media server 203 is unmounted and remounted just before execution of block 1003 (although not specifically shown in the operational flow of FIG. 10) to ensure that the requested streaming media files (e.g., video clips) are not present in the media server's memory (e.g., cache) but are instead required to be retrieved from disk.

In operational block 1004, server performance data is collected for media server 203 in servicing clients 201. More specifically, in a preferred embodiment ServerStats (e.g., Server Overload Metric) and ClientStats (e.g., Degraded Stream Quality Metric) are collected for media server 203.

In operational block 1005, a determination is made whether the maximum capacity of media server 203 is exceeded. That is, the collected performance data is evaluated to determine whether the media server's maximum capacity was exceeded in servicing the clients requesting access to the unique files in block 1003. Such a determination may be made, for example, by evaluating, among other things, the Server Overload Metric, which provides information about the number of packets sent with violation of "on-time delivery."

If it is determined in block 1005 that the media server's maximum capacity was not exceeded, then operation advances to block 1006 whereat the number of clients 201 is increased. That is, because media server 203 was capable of supporting the initial number of clients 201 requesting access to unique files at the set encoding bit rate (e.g., 28 Kb/s), the number of clients 201 is then increased to re-test media server 203 to determine whether it can support this greater workload. Accordingly, from block 1006, operation returns to block 1003 whereat clients 201 (now increased in number) each request access to different files from media server 203 encoded at the set bit rate (e.g., 28 Kb/s). As mentioned above, preferably the file system of media server 203 is again unmounted and remounted before execution of block 1003 (although not specifically shown in the operational flow of FIG. 10) to ensure that the requested streaming media files (e.g., video clips) are not present in the media server's memory (e.g., cache) but are instead required to be retrieved from disk.

Once it is determined in operational block 1005 that the media server's maximum capacity is exceeded (i.e., that media server 203 is overloaded and is unable to support the workload applied to it), execution advances to block 1007. At block 1007, the result of the UFB for the encoding bit rate being tested (e.g., 28 Kb/s) is set. More specifically, the capacity of media server 203 under the UFB for the encoding bit rate being tested (e.g., 28 Kb/s) is set to the maximum number of concurrent client accesses for which media server 203 was capable of supporting streams (e.g., the previous number of concurrent clients 201 that did not result in the maximum server capacity being exceeded in block 1005).

In operational block 1008, a determination is made as to whether the UFB for the maximum encoding bit rate to be tested has been executed. That is, it is determined whether all of the encoding bit rates of interest (e.g., all six encoding bit rates in the above example) have been tested. If not, then operation advances to block 1009 whereat the encoding bit rate is set to the next bit rate to be tested (e.g., increased from 28 Kb/s to 56 Kb/s). In operational block 1010, the number of clients 201 to be used for testing is reset to the initial number (e.g., to two clients), and operation then returns to operational block 1003 and testing of media server 203 continues in the manner described above for the initial encoding bit rate (e.g., 28 Kb/s) in order to determine the results of the UFB for this next encoding bit rate (e.g., 56 Kb/s). Once it is determined in operational block 1008 that the results of the UFB have been determined for all of the encoding bit rates of interest (e.g., for all of the encoding bit rates of media files stored at media server 203), then operation ends at block 1011.

While the maximum achievable media server capacity depends on the encoding bit rate of the files, the performance data collected at server 203 and clients 201 (at operational block 1004) are again similar. Using results from the two sub-benchmarks with files encoded at 112 Kb/s and 350 Kb/s, more details about server performance in the above-described specific example testbed configuration are described below, including its limits and bottlenecks under the UFB.

For files encoded at 112 Kb/s, the capacity of this specific example configuration of media server 203 is reached at 460 concurrent streams under the UFB, and for files encoded at 350 Kb/s, the capacity of such media server 203 under its UFB is reached at 165 concurrent streams. Again, it should be observed that the media server capacity scales differently than the encoding bit rates of the underlying files: the difference in encoding bit rates between 112 Kb/s file and 350 Kb/s file is 3.125, while the difference in server capacity for corresponding bit rates is only 2.8.

Figure 11A:
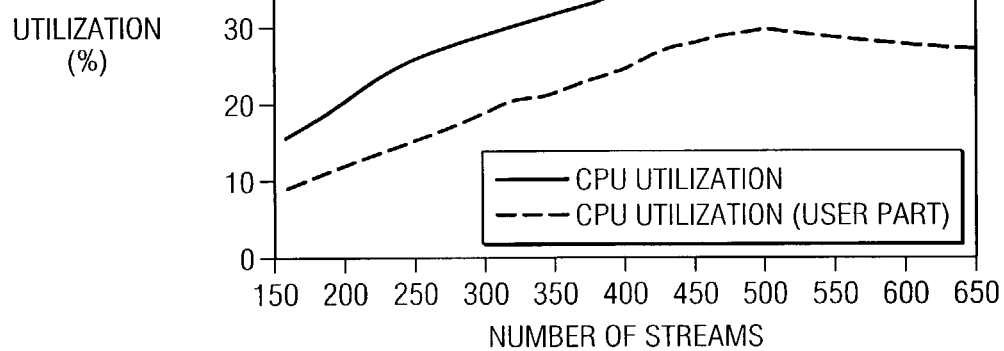
FIGS. 11A and 11B show graphs illustrating the CPU utilization of the example media server of FIG. 2 under UFB tests conducted according to the operational flow of FIG. 10 at 112 Kb/s and 350 Kb/s file bit rates, respectively.
Figure 11B:
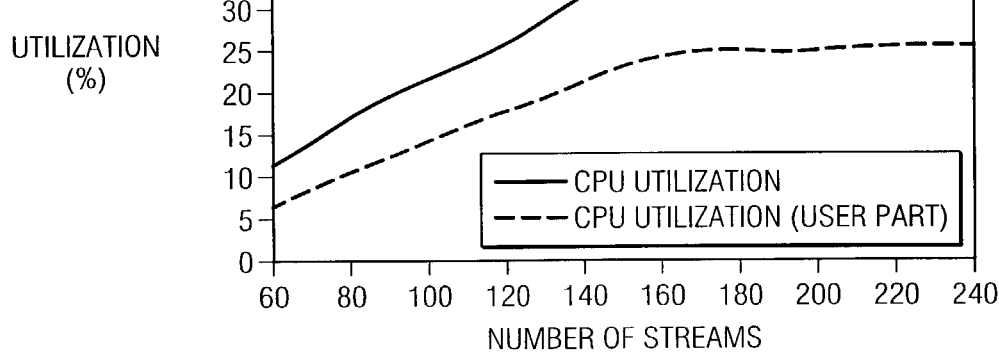

FIGS. 11A and 11B show graphs illustrating the CPU utilization and the application related part of it for the 112 Kb/s and 350 Kb/s file bit rates, respectively, under UFB testing. For the UFB, the CPU utilization of this example configuration of media server 203 is much lower than for its SFB. For all of the tests in this study of UFB, the server's CPU is below 45% and it is therefore not a resource which limits the server's performance. It should be understood that the server performance under UFB is disk-bound: this particular bottleneck is hard to measure with the traditional performance tools. The maximum bandwidth delivered by a disk depends on the number of concurrent streams it can support with an acceptable level of jitter, i.e. without violating on-time delivery constraints.

Figure 12A:
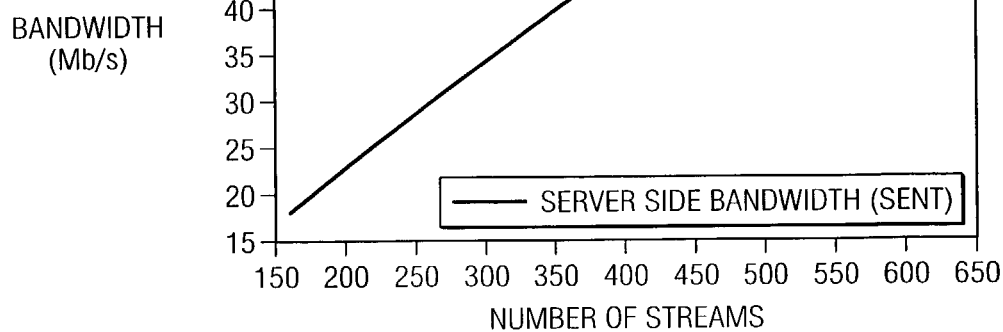
FIGS. 12A and 12B show graphs illustrating the overall bandwidth in Mb/s delivered at the server side in UFB tests conducted according to the operational flow of FIG. 10 on the example media server of FIG. 2.
Figure 12B:
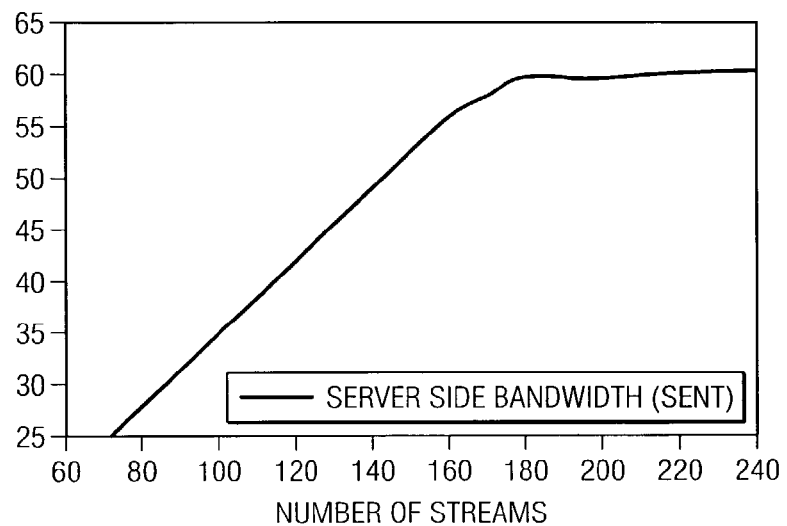

FIGS. 12A and 12B show graphs illustrating the overall bandwidth in Mb/s delivered at the server side 203. It grows linearly, until server capacity is reached, and after that bandwidth delivered by server 203 flattens. As shown in FIG. 12A, for the UFB and files encoded at 112 Kb/s, the bandwidth delivered by server 203 peaks at 51.2 Mb/s (which is equivalent of 6.4 megabytes per second (MB/s)). As shown in FIG. 12B, for files encoded at 350 Kb/s, the maximum delivered bandwidth is 57.8 Mb/s (which is equivalent of 7.2 MB/s). Thus, the bandwidth delivered by server 203 is far lower than the available 10 MB/s bandwidth provided by the four Ultra2 SCSI connections in this specific experimental setup: each of the Ultra2 SCSI connection is officially rated at 80 MB/s and is capable of sustaining 60 MB/s.

Figure 13A:
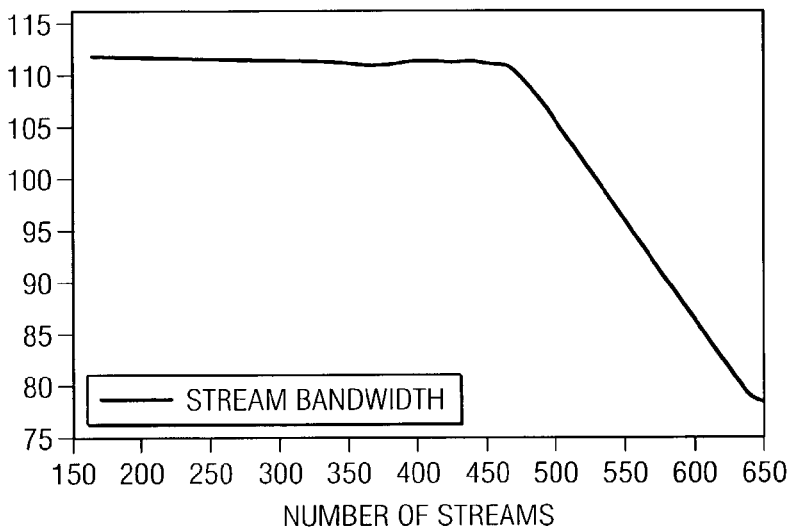
FIGS. 13A and 13B show graphs illustrating complementary information from the client side in the UFB tests conducted according to the operational flow of FIG. 10 on the example media server of FIG. 2.
Figure 13B:
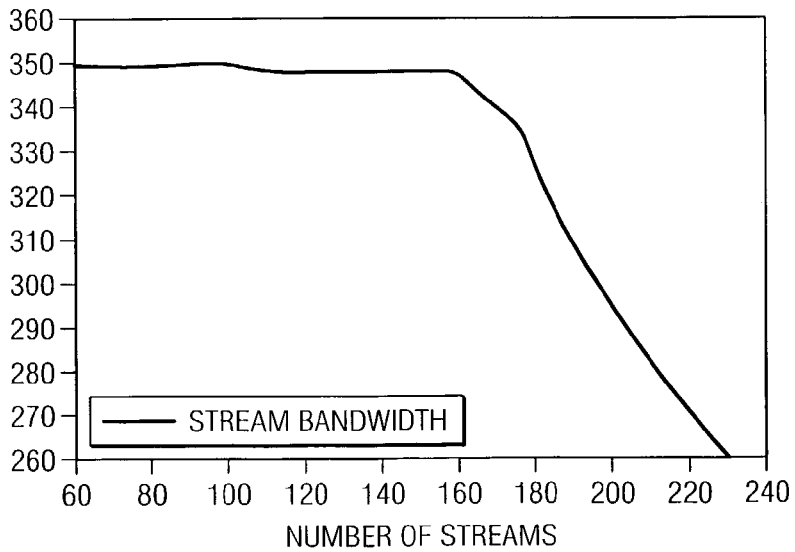

FIGS. 13A and 13B present graphs showing complementary information from the client side 201. As shown, once server capacity is reached, the quality of the stream starts to degrade significantly. For instance, once server capacity is reached, 10% of extra load causes around 9% of stream bandwidth degradation. The set of graphs in FIGS. 12A-12B and 13A-13B reveals a similar server behavior under server overload for the UFB as was observed for the SFB described above in conjunction with FIGS. 6A-6B and 7A-7B. This reflects that media server 203 has a typical behavior under overload conditions across different workload types.

Figure 14A:
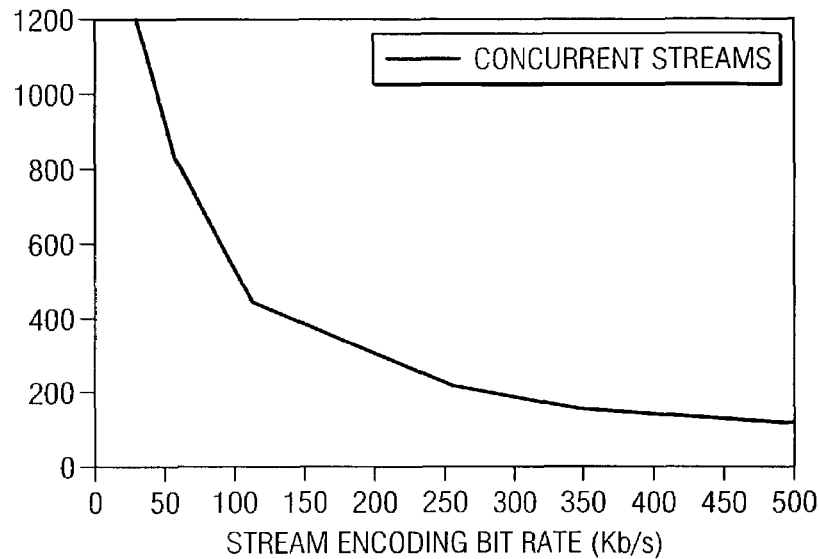
FIG. 14A shows a graph illustrating the maximum capacity in concurrent streams achievable by the example media server of FIG. 2 across six different encoding bit rates under UFB testing according to the operational flow of FIG. 10.
Figure 14B:
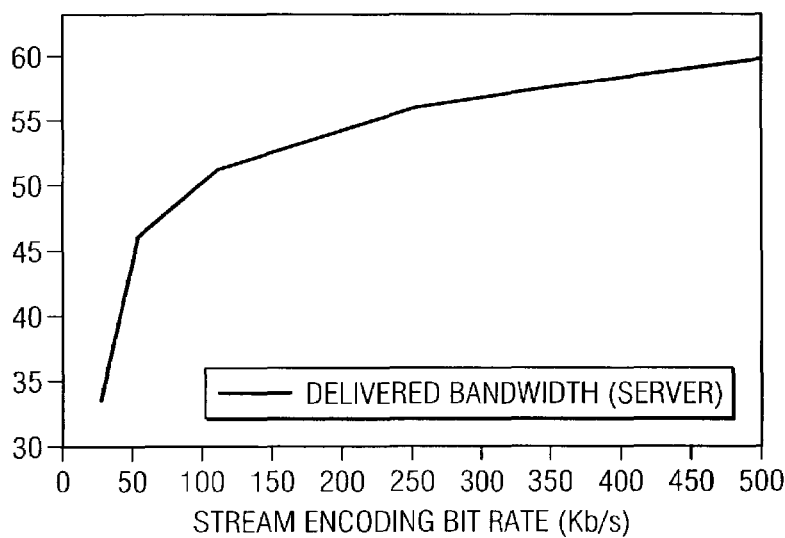
FIG. 14B shows a graph illustrating the corresponding maximum bandwidth in Mb/s delivered by the example media server of FIG. 2 across the six different encoding bit rates under UFB testing according to the operational flow of FIG. 10.

FIG. 14A presents a graph illustrating the maximum capacity in concurrent streams achievable by streaming media server 203 across six different encoding bit rates under the UFB. FIG. 14B shows a graph illustrating the corresponding maximum bandwidth in Mb/s delivered by media server 203 for the different encoding bit rates under UFB. Again, media server 203 is capable of delivering much lower bandwidth under the lower encoding bit rates.

Figure 15:
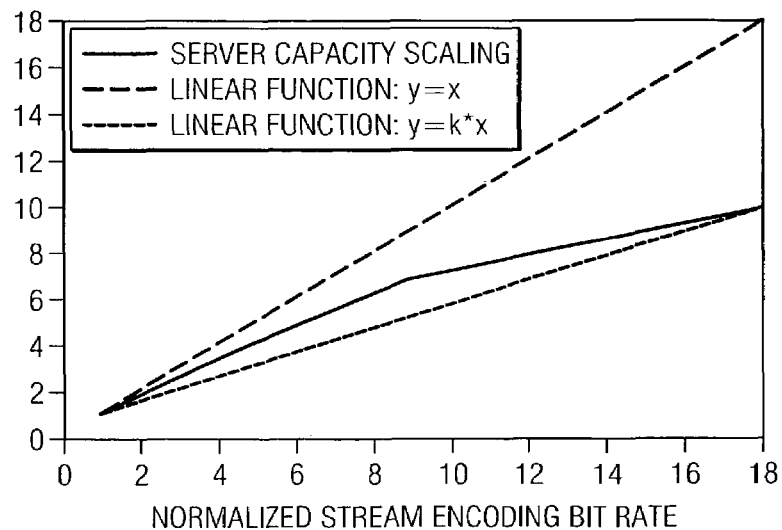
FIG. 15 shows a normalized graph reflecting the scaling rules for the media server capacity under UFB testing according to the operational flow of FIG. 10 across various different encoding bit rates for the example media server of FIG. 2.

FIG. 15 shows the normalized graph reflecting the scaling rules for the media server capacity under the UFB and different encoding bit rates. In FIG. 15, point (1,1) presents the maximum capacity (120 concurrent streams) achievable by this specific example server configuration 203 when all of clients 201 in the test are accessing different (unique) files encoded at a 500 Kb/s bit rate. Each absolute value for the other encoding bit rates is normalized with respect to it. For example, the maximum capacity achievable by server 203 under UFB and a 28 Kb/s encoding bit rate is 1200 concurrent streams and is represented by a point (17.9, 10) in FIG. 15. FIG. 15 shows that the media server capacity scales non-linearly compared to the encoding bit rates of the underlying files being accessed. For example, the difference between the highest and lowest bit rate of media streams used in this experiment is about 18 times. However, the difference in maximum number of concurrent streams server 203 is capable of supporting for corresponding bit rates is only 10 times.

FIG. 15 shows that the capacity scaling rules under UFB are non-trivial and are different from the capacity scaling rules under SFB. As mentioned above, the knowledge of server capacity scaling rules for different encoding bit rates and different workload types is advantageous for designing an efficient utility-aware media service and accurate admission control strategies.

In summary, under the UFB all of the streams read their files from disk. Thus, practically, this benchmark measures a streaming media server capacity when the media content is delivered entirely from the disk. The performance results under such workload type are highly dependent on a choice of a file system and disk configuration. That is, under the UFB, the file system and disk configuration resources become the limiting resources on the server's capacity as opposed to the CPU utilization, which is the limiting resource on the server's capacity under the SFB. Service providers might use the proposed UFB for performance evaluation of different components available in a Utility Data Center infrastructure, for example, to make the right choices for the optimal performing system configurations.

Figure 16:
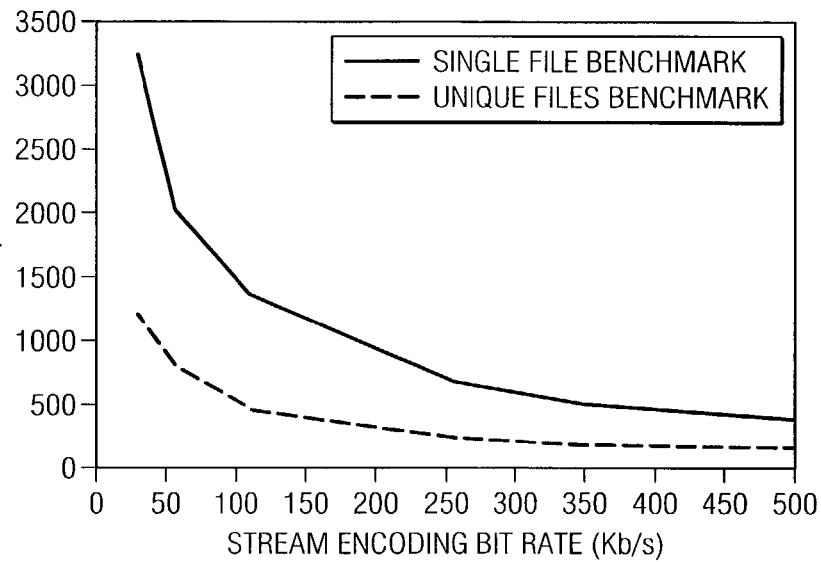
FIG. 16 shows a graph comparing achievable media server capacity for SFB versus UFB for the example media server of FIG. 2.

Finally, FIG. 16 shows a graph comparing achievable media server capacity for SFB versus UFB. The media server performance, in this example, is 2.5-3 times higher under the SFB than under the UFB. These results quantify the performance benefits for multimedia applications when media streams are delivered from memory, as well as suggest that much higher performance can be achieved for workloads that exhibit a high degree of shared client accesses to the same media files. The results from media workload analysis show that there is typically a high degree of shared client accesses to a small subset of media files, see e.g., S. Acharya, B. Smith, P. Parnes, "Characterizing User Access to Videos on the World Wide Web", In *Proc. of ACM/SPIE Multimedia Computing and Networking*, San Jose, Calif., January 2000; Almeida, J. M., J. Krueger, D. L. Eager, an M. K. Vernon, "Analysis of Educational Media Server Workloads", *Proc. 11$^{th}$ Int'l. Workshop on Network and Operating System Support for Digital Audio and Video* (NOSSDAV 2001), June 2001; and L. Cherkasova, M. Gupta, "Characterizing Locality, Evolution, and Life Span of Accesses in Enterprise Media Server Workloads", 12$^{th}$ *Int'l. Workshop on Network and Operating System Support for Digital Audio and Video* (NOSSDAV 2002), May 2002. Moreover, 50-60% of accesses are typically due to the client browsing behavior, i.e. most of the clients are watching only the initial prefix of the file (less than 2 minutes long), see e.g., L. Cherkasova, M. Gupta, "Characterizing Locality, Evolution, and Life Span of Accesses in Enterprise Media Server Workloads", 12$^{th}$ *Int'l. Workshop on Network and Operating System Support for Digital Audio and Video* (NOSSDAV 2002), May 2002. An opportunity to combine a knowledge of server performance under different workload types with workload-specific knowledge enables the service providers to correctly size and configure their systems for better support of multimedia applications.

As described above, the basic capacity of streaming media server 203 can be measured using a set of basic benchmarks (e.g., the SFB and UFB). Once the measured capacities of media server 203 are determined under the basic benchmarks, it becomes desirable to use those benchmarks to compute the expected media server capacity for realistic workloads (e.g., mixed workloads). In view of the above, it should be recognized that a performance model that corresponds to a single resource of the media server is not always accurate for reflecting the overall load presented to the media server. That is, media servers have different bottlenecks (or different limiting resources) under different situations (e.g., under different workloads applied thereto). For instance, under the SFB the media server's limiting resource is its CPU utilization, whereas under the UFB the media server's limiting resource is its disk bandwidth. Thus, a performance model that models the media server's capacity based solely on its CPU utilization (e.g., 50% CPU utilization corresponds to 50% of the media server's maximum capacity) is not accurate in all situations, including realistic, mixed workloads presented to the media server.

Accordingly, a preferred embodiment uses the above-described SFB and UFB for a media server to derive a cost function for delivering media streams encoded at different bit rates. The cost function accurately computes the media server's capacity under any applied workload, including mixed workloads. As described further below, streams supported by the media server under an applied workload are represented as a cost to the media server's available resources. Thus, rather than modeling the media server's capacity based solely on one resource, such as its CPU utilization, a cost function is provided that models the media server's capacity based on a plurality of different resources. That is, the appropriate resources that are consumed for each stream in an applied workload are accurately determined. For instance, a cost associated with streams that require disk access (i.e., streams accessing media file(s) not available in memory) may be computed, and a cost for streams that are served from memory (i.e., streams accessing media file(s) available in memory) may be computed.

Thus, a preferred embodiment of the present invention provides a workload-aware server capacity model that is based on a cost function derived from the set of basic benchmark measurements. For instance, as described above in block 302 of FIG. 3, in a preferred embodiment the basic benchmarks for a media server are used to derive a cost function for the media server. Intuitively, the cost function defines a fraction of system resources needed to support a particular stream depending on the encoding bit rate of the corresponding file and access type to a corresponding file (e.g., whether served from memory or from disk).

Accordingly, in a preferred embodiment, each stream delivered by media server 203 is associated an access type:

"memory access" if a stream retrieves a corresponding file (or the corresponding bytes of the file) from the server's memory; and "disk access" if a stream retrieves a corresponding file from the disk.

Additionally, the following notations are used herein for describing a preferred technique for deriving a cost function for media server 203:

$X = X_1, \ldots, X_k$ provide a set of encoding bit rates of the files used in the basic benchmarks (e.g., $X_1$=28 Kb/s, $X_2$=56 Kb/s, etc.), $N_{X_i}^{single}$ is the maximum measured server capacity in concurrent streams under the SFB for a file encoded at $X_i$ Kb/s, $N_{X_i}^{unique}$ is the maximum measured server capacity in concurrent streams under the UFB for a file encoded at $X_i$ Kb/s, $cost_{X_i}^{memory}$ is a value of cost function for a stream with memory access to a file encoded at $X_i$ Kb/s, and $cost_{X_i}^{disk}$ is a value of cost function for a stream with disk access to a file encoded at $X_i$ Kb/s.

Under the UFB, all of the streams have a disk access type because all of the streams read the corresponding files from the disk. Hence, each stream requires a fraction of system resources defined by the $cost_{X_i}^{disk}$ value under the UFB.

Under the SFB, one stream has a disk access type (it reads the corresponding file from disk), and hence requires a fraction of system resources defined by the $cost_{X_i}^{disk}$ value while the rest of the concurrent streams retrieve a corresponding file from memory and, therefore have a memory access type and require a fraction of system resources defined by the $cost_{X_i}^{memory}$ value.

The following capacity equations describe the maximum server capacity measured under a set of basic benchmarks for each encoding bit rate $X_i \in X$ $$N_{X_i}^{unique} \times cost_{X_i}^{disk} = 1$$

$$1 \times cost_{X_i}^{disk} + (N_{X_i}^{single} - 1) \times cost_{X_i}^{memory} = 1$$

By solving the equations above, the corresponding cost function values are derived, as follows:

$$cost_{X_i}^{disk} = \frac{1}{N_{X_i}^{unique}}$$

-continued $$cost_{X_i}^{memory} = \frac{N_{X_i}^{unique} - 1}{N_{X_i}^{unique} \times (N_{X_i}^{single} - 1)}$$

Once the cost function is derived for media server 203, such cost functions are preferably used to compute a Load for media server 203 under an applied workload "W", as described in block 303 of FIG. 3. Preferably, such workload "W" may be any workload, including a realistic workload, such as a mixed workload. For instance, let "W" be a current workload processed by media server 203, where:

$X_w = X_1, \ldots X_{k_w}$ is a set of encoding bit rates of the files used in W ($X_w \subseteq X$), $$N_{X_{w_i}}^{memory}$$

is a number of streams having a memory access type to a subset of files encoded at $X_{w_i}$ Kb/s, and $$N_{X_{w_i}}^{disk}$$

is a number of streams having a disk access type to a subset of files encoded at $X_{w_i}$ Kb/s.

Then, the applied Load to media server 203 under workload W can be computed by a formula:

$$\text{Load} = \sum_{i=1}^{k_w} N_{X_{w_i}}^{memory} \times cost_{X_{w_i}}^{memory} + \sum_{i=1}^{k_w} N_{X_{w_i}}^{disk} \times cost_{X_{w_i}}^{disk}$$

The Load corresponds to the total cost in terms of consumed resources of the media server under the applied workload W. As described in block 304 of FIG. 3, such computed Load for media server 203 is preferably evaluated to determine the media server's capacity under the applied workload W (e.g., the media server's available capacity and/or whether the media server is overloaded). For example, in a preferred embodiment, if Load≧1, then media server 203 is overloaded (i.e., its capacity is exceeded) under the applied workload W. For instance, in deriving the above cost function, the total resources of media server 203 total 1, and thus, if the computed Load (or total "cost") to media server 203 under an applied workload "W" is greater than or equal to 1 then the resources of such media server 203 are depleted. The difference Load−1 defines the amount of overload or server exceeded capacity. If Load≦1, then media server 203 operates within its capacity, and the difference 1-Load defines the amount of available server capacity under the applied workload W.

The above-described performance model of a media server has been validated by comparing the predicted (computed) and measured media server capacities for a set of different synthetic workloads:
 single-unique-one-bit-rate,
 single-six-bit-rates, and
 unique-six-bit-rates.

Under the single-unique-one-bit-rate workload, all of clients 201 access the files encoded at the same bit rate. Let the encoding bit rate be X Kb/s. Let the number of clients 201 accessing the unique files and the number of clients 201 accessing the same (single) file be defined as follows:

$$\alpha \times N_{X_i}^{unique}$$

clients are accessing the unique files, where $\alpha \leq 1$ and $$N_{X_i}^{unique}$$

is a measured server capacity in concurrent streams under UFB for files encoded at $X_i$ Kb/s, and $$(1 - \alpha) \times N_{X_i}^{single}$$

clients are accessing the same file where $$N_{X_i}^{single}$$

is a measured server capacity in concurrent streams under SFB for a file encoded at $X_i$ Kb/s.

The number of clients (or concurrent streams) in this workload is designed in a special way: if the performance model of the server capacity is correct, then under the single-unique-one-bit-rate workload the server maximum capacity should be reached. This is referred to herein as the expected (computed) server capacity.

Using the above-described specific example of an experimental testbed, a single-unique-one-bit-rate mix workload was run for a=⅓, a=½, and a=⅔ and six bit rates of interest. In the workloads under test, the number of clients 201 accessing the unique files are fixed according to the formula defined above, and the number of clients 201 accessing the same file is slightly varied to determine experimentally when the server capacity under test is reached using the capacity metrics described above (e.g., ServerStats, ClientStats, etc.).

Figure 17A:
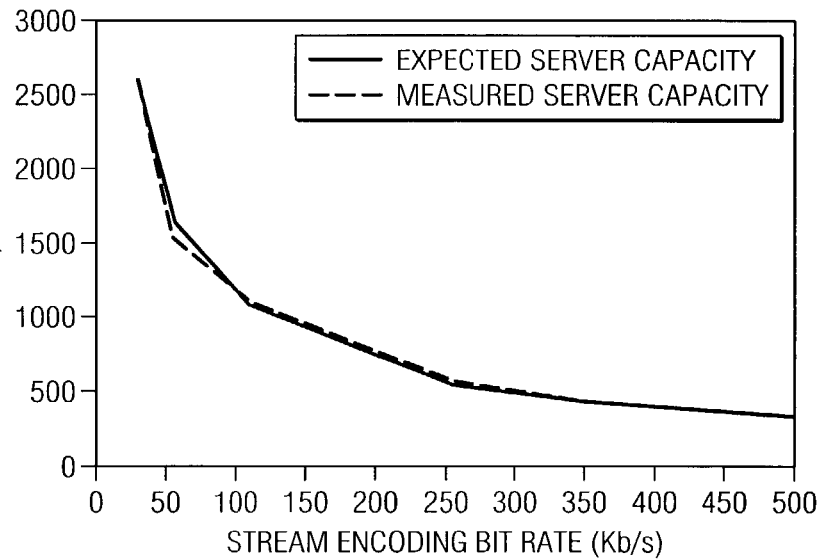
FIGS. 17A-17C show graphs illustrating the measured versus expected server capacities for the example media server of FIG. 2 under various workloads, which illustrate that the measured server capacity closely matches the expected media server capacity.
Figure 17B:
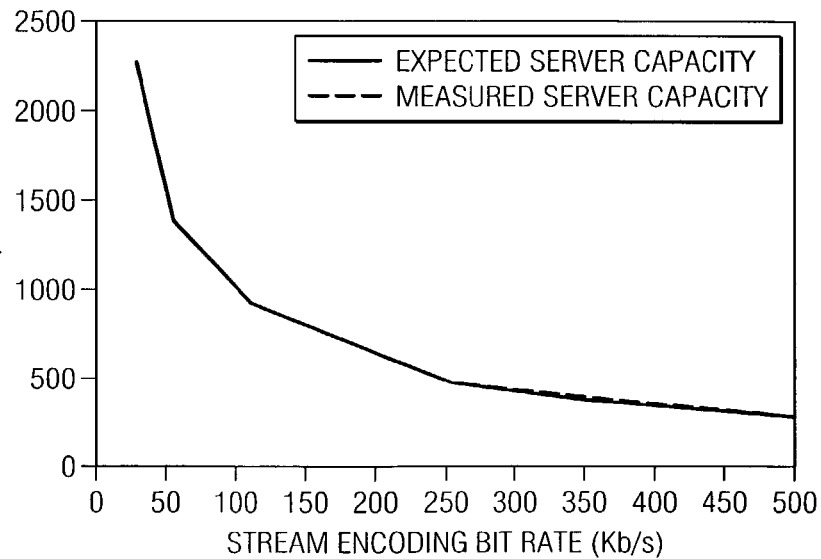
Figure 17C:
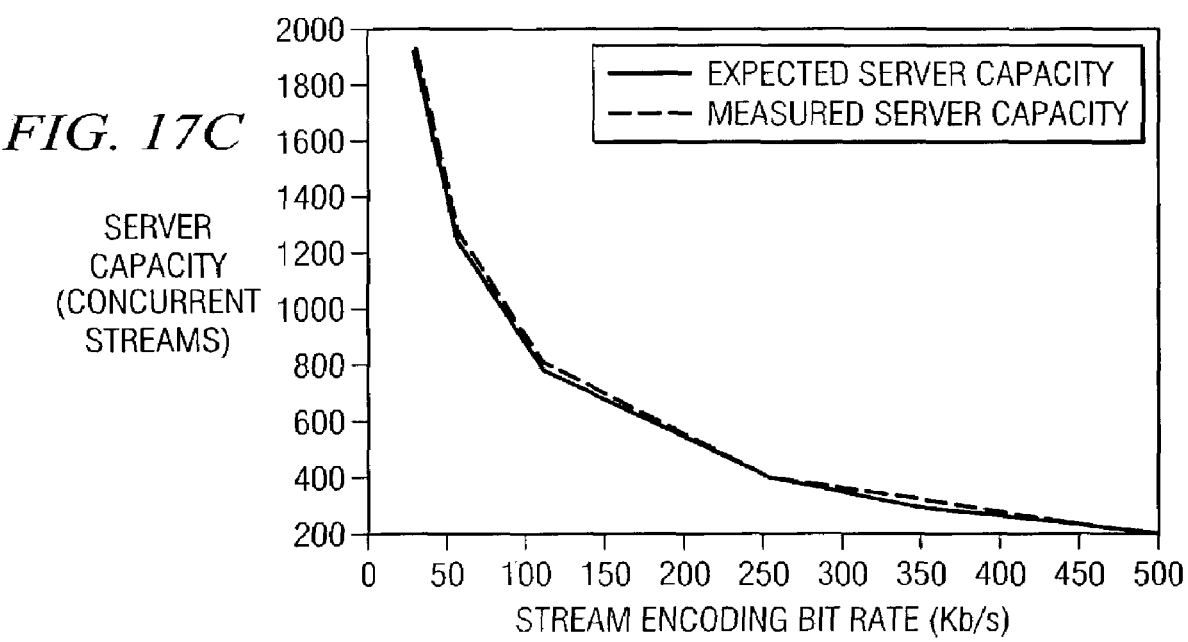

FIGS. 17A-17C show graphs illustrating the measured vs expected server capacities under single-unique-one-bit-rate workload for a=⅓, a=½, and a=⅔, respectively. As can be seen in FIGS. 17A-17C, the measured server capacity closely matches the expected media server capacity across different encoding bit rates and different values of a (the error is within 8%).

Under single-six-bit-rates workload an equal number of clients 201 are accessing the six single files encoded at six basic bit rates used in the study, i.e. N clients are accessing the same file encoded at 28 Kb/s, N clients are accessing the same file encoded at 56 Kb/s, etc.

Under unique-six-bit-rates workload an equal number of clients 201 are accessing the sets of different (unique) files encoded at six basic bit rates, i.e. N clients are accessing N different files encoded at 28 Kb/s, N clients are accessing N different files encoded at 56 Kb/s, etc.

Figure 18:
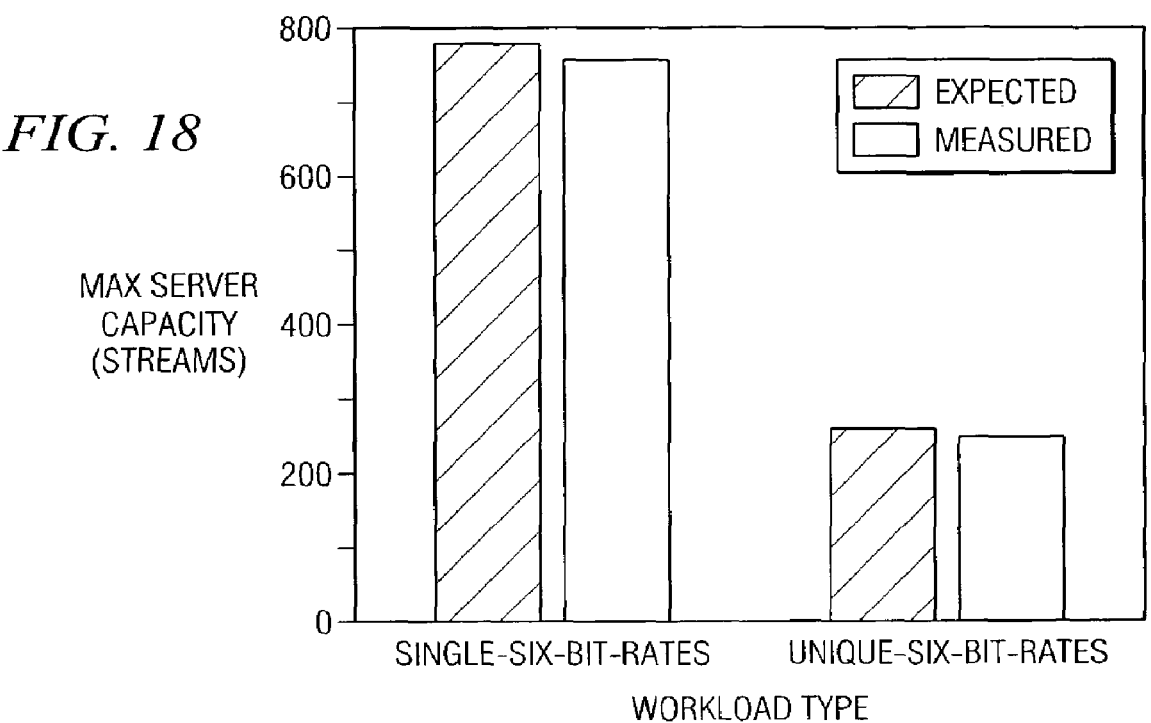
FIG. 18 shows a graph illustrating the measured versus expected server capacities for the example media server of FIG. 2 under single-six-bit-rates and unique-six-bit rates workloads, which illustrates that the measured server capacity matches the expected server capacity very well for both workloads.

FIG. 18 shows a graph illustrating the measured versus expected server capacities under single-six-bit-rates and unique-six-bit rates workloads. As can be seen, the measured server capacity matches the expected server capacity very well for both workloads (the error is less than 4%).

Thus, the performance model of media server capacity based on a cost function derived from the set of basic benchmark measurements closely approximates the expected media server capacity for realistic workloads.

As described above in conjunction with the example testbed configuration of FIG. 2, embodiments of the present invention may be used for evaluating the capacity of a media server configuration before actually implementing the media server in a client-server network for supporting clients. That is, the media server may be tested to determine whether it can support an expected workload from a population of clients and/or to determine configuration changes that may improve the media server's capacity.

Figure 19:
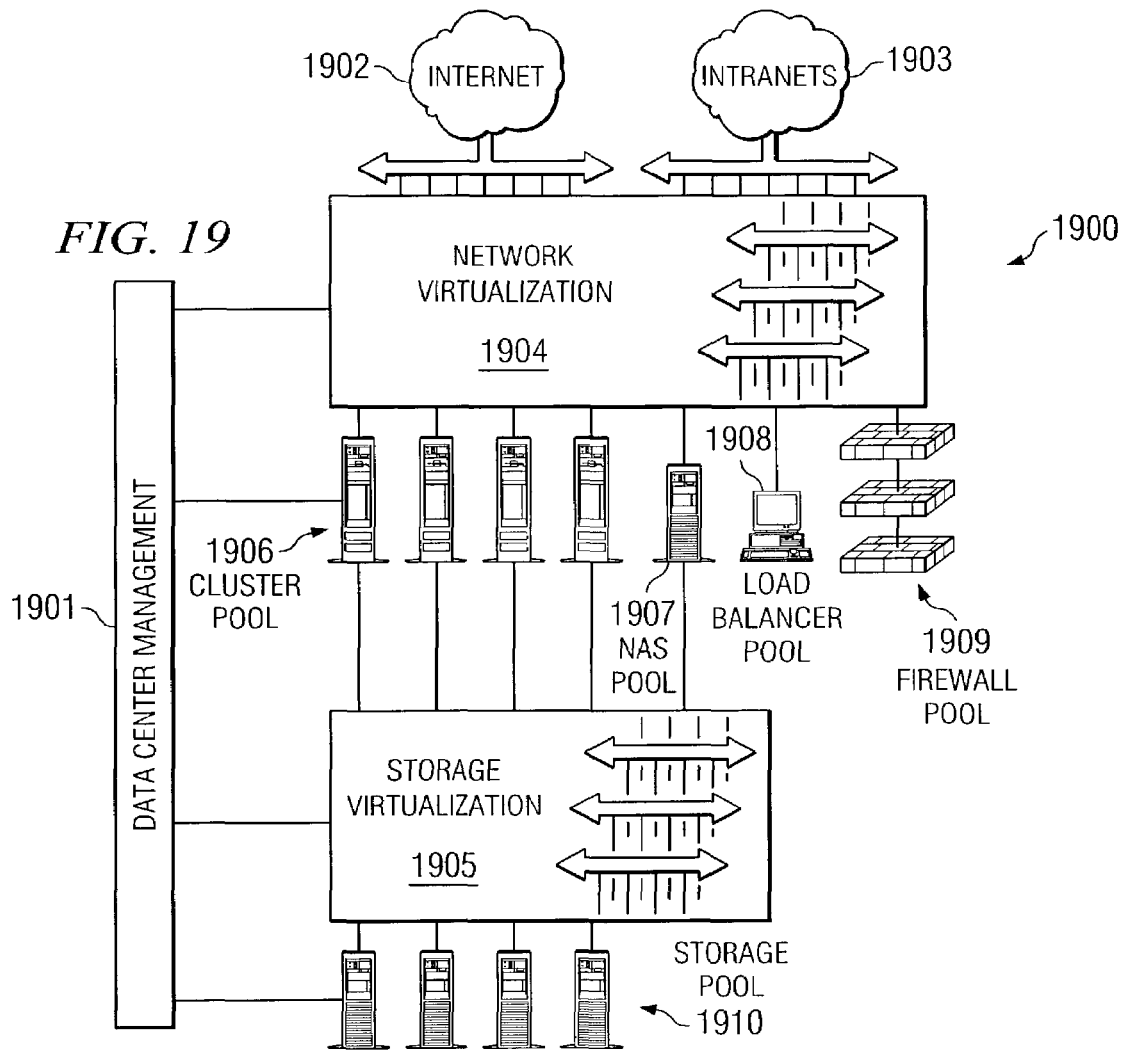
FIG. 19 shows an example Utility Data Center arrangement in which resources may be dynamically allocated and in which certain embodiments of the present invention may be implemented.

Further, embodiments of the present invention may be utilized for measuring the capacity of a media server during its runtime once it is actually implemented in a client-server network. That is, embodiments of the present invention may be utilized for measuring the capacity of a media server in supporting actual workloads applied thereto by a population of clients. After the media server is actually implemented in a client-server network, its capacity (e.g., its available capacity) may be monitored for supporting actual workloads applied thereto using the derived cost function. This is particularly attractive in systems in which resources may be dynamically allocated, such as in Utility Data Centers (UDCs), for supporting the applied workloads. For instance, FIG. 19 shows an example UDC 1900 in which resources may be dynamically allocated. Such a UDC 1900 may be used for implementing a media server complex in which resources are dynamically allocated for the media server responsive to the workload applied thereto in accordance with the measured capacity of the media server. Implementations of UDC 1900 are known in the art and therefore UDC 1900 is only briefly described herein. As shown in FIG. 19, UDC 1900 comprises data center management logic 1901 that is operable to manage the allocation of resources in UDC 1900. UDC 1900 is coupled to a communications network, such as the Internet 1902 and/or Intranets 1903, thus enabling access by clients (not shown) via such communication networks. Network virtualization logic 1904 and storage virtualization logic 1905 is also included. UDC 1900 further comprises cluster pool 1906, network-attached storage (NAS) pool 1907, load balancer pool 1908, firewall pool 1909, and storage pool 1910. Again, data center management logic 1901 is operable to manage the allocation of resources, such as resources available in cluster pool 1906, NAS pool 1907, and storage pool 1910. Thus, by implementing the cost function of a preferred embodiment of the present invention for measuring the capacity of the media server complex under an applied workload, data center management logic 1901 may, responsive to the measured capacity, dynamically allocate the appropriate resources for supporting the applied workload.

When implemented via computer-executable instructions, various elements of embodiments of the present invention for measuring the capacity of a media server for supporting media streams under an applied workload are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 20:
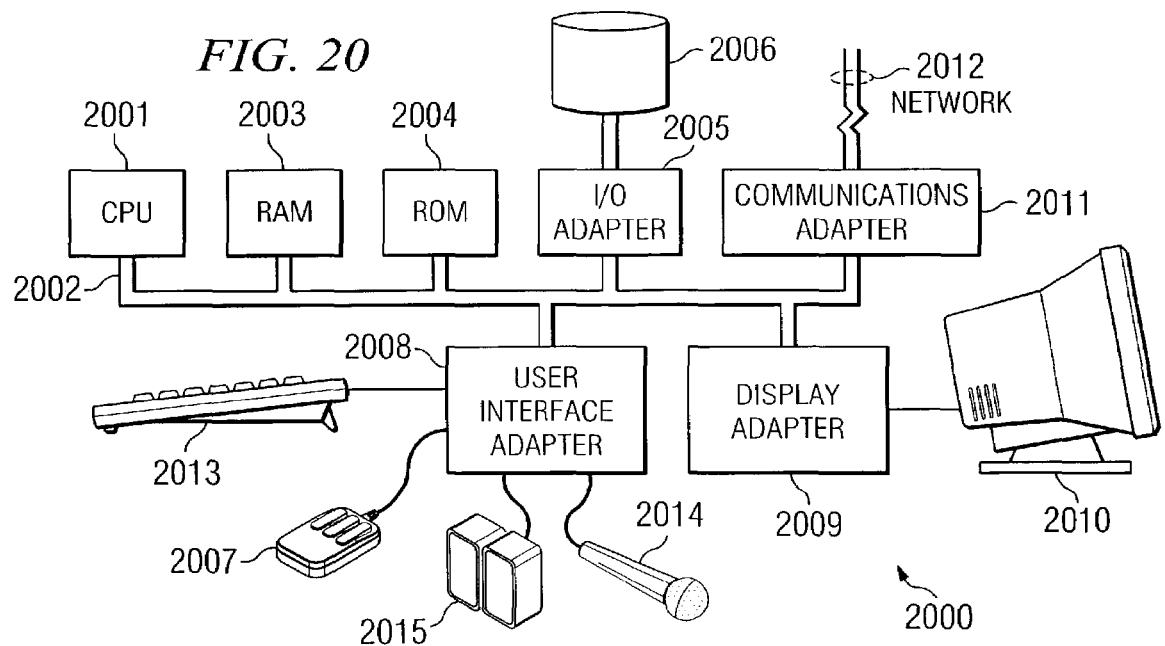
FIG. 20 shows an example computer system on which embodiments of the present invention may be implemented.

FIG. 20 illustrates an example computer system 2000 adapted according to embodiments of the present invention. That is, computer system 2000 comprises an example system on which embodiments of the present invention may be implemented. Central processing unit (CPU) 2001 is coupled to system bus 2002. CPU 2001 may be any general purpose CPU. The present invention is not restricted by the architecture of CPU 2001 as long as CPU 2001 supports the inventive operations as described herein. CPU 2001 may execute the various logical instructions according to embodiments of the present invention. For example, CPU 2001 may execute machine-level instructions according to the exemplary operational flows described above in conjunction with FIGS. 3, 4, and 10.

Computer system 2000 also preferably includes random access memory (RAM) 2003, which may be SRAM, DRAM, SDRAM, or the like. Computer system 2000 preferably includes read-only memory (ROM) 2004 which may be PROM, EPROM, EEPROM, or the like. RAM 2003 and ROM 2004 hold user and system data and programs, as is well known in the art.

Computer system 2000 also preferably includes input/output (I/O) adapter 2005, communications adapter 2011, user interface adapter 2008, and display adapter 2009. I/O adapter 2005, user interface adapter 2008, and/or communications adapter 2011 may, in certain embodiments, enable a user to interact with computer system 2000 in order to input information thereto.

I/O adapter 2005 preferably connects storage device(s) 2006, such as one or more of hard drive, compact disc (CD) drive, floppy disk drive, tape drive, etc. to computer system 2000. The storage devices may be utilized when RAM 2003 is insufficient for the memory requirements associated with storing data for application programs. Communications adapter 2011 is preferably adapted to couple computer system 2000 to network 2012 (e.g., network 103 of FIG. 1).

User interface adapter 2008 couples user input devices, such as keyboard 2013, pointing device 2007, and microphone 2014 and/or output devices, such as speaker(s) 2015 to computer system 2000. Display adapter 2009 is driven by CPU 2001 to control the display on display device 2010.

It shall be appreciated that the present invention is not limited to the architecture of system 2000. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method comprising:
   identifying a mixed workload, wherein the mixed workload corresponds to a number of media streams being served concurrently by a media server to a population of clients wherein all of said number of media streams do not comprise common content encoded at a common bit rate; and
   measuring the capacity of the media server for supporting the mixed workload by using a cost function to compute a load for the media server under the mixed workload, wherein the cost function for computing the load of the media server comprises:

$$Load = \sum_{i=1}^{k_W} N_{X_{W_i}}^{memory} \times cost_{X_{W_i}}^{memory} + \sum_{i=1}^{k_W} N_{X_{W_i}}^{disk} \times cost_{X_{W_i}}^{disk},$$

wherein the mixed workload comprises $k_w$ concurrent streams, $X_w = X_1, \ldots X_{k_w}$ is a set of encoded bit rates of files served in the mixed workload $$N_{X_{w_i}}^{memory}$$

is a number of streams in the mixed workload having a memory access to a subset of files encoded at $X_{w_i}$ Kb/s, $$cost_{X_{W_i}}^{memory}$$

is a cost of consumed resources for a stream having a memory access to a file encoded at $X_{w_i}$ Kb/s, $$N_{X_{w_i}}^{disk}$$

is a number of streams in the mixed workload having a disk access to a subset of files encoded at $X_{w_i}$ Kb/s, and $$cost_{X_{W_i}}^{disk}$$

is a cost of consumed resources for a stream having a disk access to a file encoded at $X_{w_i}$ Kb/s.

2. The method of claim 1 wherein said computed load of the media server corresponds to consumed capacity of the media server under the mixed workload.

3. The method of claim 1 wherein said computed load of the media server corresponds to consumed resources of the media server under the mixed workload.

4. The method of claim 3 wherein the consumed resources of the media server comprise disk bandwidth and processor utilization.

5. The method of claim 1 further comprising:
evaluating the computed load of the media server to determine the consumed capacity of the media server under the mixed workload.

6. The method of claim 1 further comprising:
evaluating the computed load of the media server to determine the available capacity of the media server under the mixed workload.

7. The method of claim 1 wherein the mixed workload comprises all of said number of media streams providing common content from files encoded at different bit rates, but not all of said number of media streams providing the same one of said files.

8. The method of claim 1 wherein the mixed workload comprises all of said number of media streams providing files that are encoded at the same encoding bit rate, but not all of said number of media streams providing the same content.

9. The method of claim 1 wherein the mixed workload comprises not all of said number of media streams providing files that are encoded at the same encoding bit rate, and not all of said number of media streams providing the same content.

10. The method of claim 1 further comprising:
determining an allocation of resources for the media server based at least in part on the computed load of the media server.

11. Computer-executable software code stored to a computer-readable medium, said computer-executable software code for measuring the capacity of a media server for supporting concurrent media streams to a population of clients, the computer-executable software code comprising:
code for receiving identification of a mixed workload, wherein the mixed workload corresponds to a number of media streams served concurrently by a media server to a population of clients in which all of said number of media streams do not comprise common content encoded at a common bit rate; and
code for computing a load for the media server under the mixed workload, wherein the load corresponds to the amount of resources available to the media server that are consumed for supporting the mixed workload, wherein the code for computing a load comprises a cost function for computing the load, said cost function comprising:

$$\text{Load} = \sum_{i=1}^{k_w} N_{X_{w_i}}^{memory} \times cost_{X_{w_i}}^{memory} + \sum_{i=1}^{k_w} N_{X_{w_i}}^{disk} \times cost_{X_{w_i}}^{disk},$$

wherein the mixed workload comprises $k_w$ concurrent streams, $X_w = X_1, \ldots X_{k_w}$ is a set of encoded bit rates of files served in the mixed workload, $$N_{X_{w_i}}^{memory}$$

is a number of streams in the mixed workload having a memory access to a subset of files encoded at $X_{w_i}$ Kb/s, $$cost_{X_{W_i}}^{memory}$$

is a cost of consumed resources for a stream having a memory access to a file encoded at $X_{w_i}$ Kb/s, $$N_{X_{w_i}}^{disk}$$

is a number of streams in the mixed workload having a disk access to a subset of files encoded at $X_{w_i}$ Kb/s, and $$cost_{X_{W_i}}^{disk}$$

is a cost of consumed resources for a stream having a disk access to a file encoded at $X_{w_i}$ Kb/s.

12. The computer-executable software code of claim 11 wherein the resources available to the media server comprise disk bandwidth and processor utilization.

13. The computer-executable software code of claim 11 further comprising:
code for evaluating the computed load of the media server to determine the consumed capacity of the media server under the mixed workload.

14. The computer-executable software code of claim 11 further comprising:
code for evaluating the computed load of the media server to determine the available capacity of the media server under the mixed workload.

15. The computer-executable software code of claim 11 wherein the mixed workload comprises one selected from the group consisting of:
- all of said number of media streams providing common content from files encoded at different bit rates but not all of said number of media streams providing the same one of said files, all of said number of media streams providing files that are encoded at the same encoding bit rate but not all of said number of media streams providing the same content, and not all of said number of media streams providing files that are encoded at the same encoding bit rate and not all of said number of media streams providing the same content.

16. The computer-executable software code of claim 11 further comprising:
- code for determining an allocation of resources for the media server based at least in part on the computed load of the media server.

* * * * *

UNITED STATES PATENT AND TRADEMARK OFFICE
CERTIFICATE OF CORRECTION

PATENT NO.        : 7,424,528 B2
APPLICATION NO.   : 10/306279
DATED             : September 9, 2008
INVENTOR(S)       : Ludmila Cherkasova et al.

It is certified that error appears in the above-identified patent and that said Letters Patent is hereby corrected as shown below:

In column 29, line 3, in Claim 1, after "workload" insert -- , --.

Signed and Sealed this

Twenty-seventh Day of January, 2009

JOHN DOLL
*Acting Director of the United States Patent and Trademark Office*